US010660043B2

(12) United States Patent
Akkarakaran et al.

(10) Patent No.: US 10,660,043 B2
(45) Date of Patent: May 19, 2020

(54) TRANSMIT POWER CONTROL COMMAND HANDLING ACROSS MULTIPLE DOWNLINK CONTROL INFORMATION

(71) Applicant: QUALCOMM Incorporated, San Diego, CA (US)

(72) Inventors: Sony Akkarakaran, Poway, CA (US); Peter Gaal, San Diego, CA (US); Yi Huang, San Diego, CA (US); Wei Yang, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/253,211

(22) Filed: Jan. 21, 2019

(65) Prior Publication Data

US 2019/0230597 A1 Jul. 25, 2019

Related U.S. Application Data

(60) Provisional application No. 62/621,033, filed on Jan. 23, 2018.

(51) Int. Cl.
*H04W 52/14* (2009.01)
*H04W 52/36* (2009.01)
(Continued)

(52) U.S. Cl.
CPC ....... *H04W 52/143* (2013.01); *H04W 52/146* (2013.01); *H04W 52/228* (2013.01);
(Continued)

(58) Field of Classification Search
None
See application file for complete search history.

(56) References Cited

U.S. PATENT DOCUMENTS

2011/0081939 A1 4/2011 Damnjanovic et al.
2013/0094466 A1* 4/2013 Kim ..................... H04W 52/146
370/329

(Continued)

OTHER PUBLICATIONS

Fujitsu: "Multi-Beam Operation for NR-PDCCH," 3GPP Draft; R1-1717717 Multi-Beam Operation for NR-PDCCH Final, 3rd Generation Partnership Project (3GPP), Mobile Competence Centre; 650, Route Des Lucioles; F-06921 Sophia-Antipolis Cedex; France, vol. Ran WG1, No. Prague, Czech Republic; Oct. 9, 2017-Oct. 13, 2017, Oct. 8, 2017 (Oct. 8, 2017), XP051340902, pp. 1-5, Retrieved from the Internet: URL: http://www.3gpp.org/ftp/Meetings_3GPP_SYNC/RAN1/Docs/ [retrieved on Oct. 8, 2017].
(Continued)

*Primary Examiner* — Mohammed Rachedine
(74) *Attorney, Agent, or Firm* — Holland & Hart LLP

(57) ABSTRACT

A user equipment (UE) may apply transmit power control (TPC) commands and transmit uplink information based on received downlink control information (DCI). A UE may receive multiple DCI messages including multiple TPC commands for an uplink transmission. The power level for the uplink transmission may be adjusted based on the combination of TPC commands. For example, the TPC commands may be considered together (e.g., added, averaged, etc.), the latest TPC command may be used, etc. In some cases, a change in TPC command for an uplink transmission (e.g., from a previous TPC command for the uplink transmission indicated via other DCI) may indicate a change in one or more transmission attributes for the uplink transmission. In some cases, a UE may receive a grant for a prioritized transmission, resulting in discontinuous transmission (DTX) of a previous transmission, which may result in TPC modification by the UE.

30 Claims, 17 Drawing Sheets

(51) Int. Cl.
   *H04W 52/58*   (2009.01)
   *H04W 52/32*   (2009.01)
   *H04W 52/22*   (2009.01)
(52) U.S. Cl.
   CPC ....... *H04W 52/325* (2013.01); *H04W 52/367*
           (2013.01); *H04W 52/58* (2013.01)

(56) References Cited

U.S. PATENT DOCUMENTS

2017/0041123 A1* 2/2017 Yang ..................... H04L 1/1812
2017/0223672 A1* 8/2017 Dinan .................. H04W 52/367
2019/0124627 A1* 4/2019 Park ..................... H04L 5/0053

OTHER PUBLICATIONS

International Search Report and Written Opinion—PCT/US2019/014565—ISA/EPO—dated Apr. 4, 2019.

* cited by examiner

TRANSMIT POWER CONTROL COMMAND HANDLING ACROSS MULTIPLE DOWNLINK CONTROL INFORMATION

CROSS REFERENCES

The present Application for Patent claims the benefit of U.S. Provisional Patent Application No. 62/621,033 by AKKARAKARAN, et al., entitled "TRANSMIT POWER CONTROL COMMAND HANDLING ACROSS MULTIPLE DOWNLINK CONTROL INFORMATION," filed Jan. 23, 2018, assigned to the assignee hereof, and expressly incorporated herein.

BACKGROUND

The following relates generally to wireless communication, and more specifically to transmit power control (TPC) command handling across multiple downlink control information (DCI) messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless systems may enable communication between a base station and a UE over shared or unlicensed radio frequency spectrum bands, or over different radio frequency spectrum bands (e.g., licensed radio frequency spectrum bands and unlicensed radio frequency spectrum bands). Scheduling of resources in these wireless communications systems may be based on downlink or uplink grants in DCI messages provided to a UE by a base station. DCI messages may also include other types of DCI, including TPC commands for uplink transmissions by the UE to the base station. In some cases, multiple TPC commands may correspond to a single uplink transmission, such as a transmission of uplink control information. As such, improved techniques for handling TPC commands across multiple DCI messages for a single transmission of uplink control information may be desired.

SUMMARY

The described techniques relate to improved methods, systems, devices, or apparatuses that support transmit power control (TPC) command handling across multiple downlink control information (DCI) messages. A user equipment (UE) may apply TPC commands and may transmit uplink information based on received DCI. A UE may receive multiple DCI messages including multiple TPC commands for an uplink transmission (e.g., uplink control information (UCI), uplink data, etc.). The power level for the uplink transmission may be adjusted based on the combination of TPC commands. For example, the TPC commands may be considered together (e.g., added, averaged, etc.), the latest TPC command may be used, etc. In some cases, a change in TPC command for an uplink transmission (e.g., from a previous TPC command for the uplink transmission indicated via other DCI) may indicate a change in one or more transmission attributes for the uplink transmission. In some cases, a UE may receive a grant for a prioritized transmission resulting in discontinuous transmission (DTX) of a previous transmission, which may result in TPC modification by the UE.

A method of wireless communication at a UE is described. The method may include receiving, from a base station, a set of DCI messages that include a set of TPC commands for an uplink transmission, determining a power adjustment value for the uplink transmission based on a combination of the set of TPC commands, adjusting a transmit power level based on the determined power adjustment value, and transmitting the uplink transmission to the base station at the adjusted transmit power level.

An apparatus for wireless communication at a UE is described. The apparatus may include a processor, memory in electronic communication with the processor, and instructions stored in the memory. The instructions may be executable by the processor to cause the apparatus to receive, from a base station, a set of DCI messages that include a set of TPC commands for an uplink transmission, determine a power adjustment value for the uplink transmission based on a combination of the set of TPC commands, adjust a transmit power level based on the determined power adjustment value, and transmit the uplink transmission to the base station at the adjusted transmit power level.

Another apparatus for wireless communication at a UE is described. The apparatus may include means for receiving, from a base station, a set of DCI messages that include a set of TPC commands for an uplink transmission, determining a power adjustment value for the uplink transmission based on a combination of the set of TPC commands, adjusting a transmit power level based on the determined power adjustment value, and transmitting the uplink transmission to the base station at the adjusted transmit power level.

A non-transitory computer-readable medium storing code for wireless communication at a UE is described. The code may include instructions executable by a processor to receive, from a base station, a set of DCI messages that include a set of TPC commands for an uplink transmission, determine a power adjustment value for the uplink transmission based on a combination of the set of TPC commands, adjust a transmit power level based on the determined power adjustment value, and transmit the uplink transmission to the base station at the adjusted transmit power level.

In some examples of the method, apparatuses, and non-transitory computer-readable medium described herein, determining the power adjustment value for the uplink transmission based on the combination of the set of TPC commands may include operations, features, means, or instructions for identifying a set of TPC values from the set of TPC commands, and summing the set of TPC values to determine the power adjustment value.

Some examples of the method, apparatuses, and non-transitory computer-readable medium described herein may further include operations, features, means, or instructions for scaling the set of TPC values based on a number of the set of TPC commands, where summing the set of TPC values includes summing the scaled set of TPC values.

In some examples of the method, apparatuses, and non-transitory computer-readable medium described herein, determining the power adjustment value for the uplink transmission based on the combination of the set of TPC commands may include operations, features, means, or instructions for identifying a most recently-received TPC command of the set of TPC commands, and determining the power adjustment value for the uplink transmission based on the most recently-received TPC command.

Some examples of the method, apparatuses, and non-transitory computer-readable medium described herein may further include operations, features, means, or instructions for identifying a change in at least one attribute of the uplink transmission, and determining the power adjustment value for the uplink transmission based on the combination of the set of TPC commands based on the identified change.

Some examples of the method, apparatuses, and non-transitory computer-readable medium described herein may further include operations, features, means, or instructions for receiving a value for at least one attribute in one or more of the set of DCI messages, where the change in at least one attribute of the uplink transmission may be identified based on the received value for the at least one attribute.

In some examples of the method, apparatuses, and non-transitory computer-readable medium described herein, the at least one attribute of the uplink transmission includes a UCI payload size, or a PUCCH resource assignment, or a PUCCH format, or a PUCCH resource pool, or a combination thereof.

Some examples of the method, apparatuses, and non-transitory computer-readable medium described herein may further include operations, features, means, or instructions for determining, prior to identifying the change in the at least one attribute, the power adjustment value for the UCI based on a second set of TPC commands for the UCI, the set of TPC commands restricted to may have a common TPC value for TPC commands associated with a single UCI.

In some examples of the method, apparatuses, and non-transitory computer-readable medium described herein, the uplink transmission may be a UCI, and receiving the set of DCI messages for the UCI further may include operations, features, means, or instructions for receiving at least one DCI message that includes a TPC command for an uplink data channel, the power adjustment value for the UCI determined based on the TPC command for the uplink data channel.

Some examples of the method, apparatuses, and non-transitory computer-readable medium described herein may further include operations, features, means, or instructions for receiving a DCI message that includes a first TPC command for an uplink data channel and a second TPC command for UCI on a control channel, where the uplink transmission includes the UCI.

Some examples of the method, apparatuses, and non-transitory computer-readable medium described herein may further include operations, features, means, or instructions for receiving a DCI message that includes a TPC command for an uplink data channel, and ignoring, based on the TPC command for the uplink data channel, one or more TPC commands of the set of TPC commands for UCI, where the one or more TPC commands may be for an uplink control channel, where the uplink transmission includes the UCI.

In some examples of the method, apparatuses, and non-transitory computer-readable medium described herein, the uplink transmission includes an acknowledgement on an uplink control channel, or an acknowledgement on an uplink data channel, or an uplink data transmission.

A method of wireless communication at a base station is described. The method may include identifying, by the base station, a power adjustment value to adjust a transmit power level of an uplink transmission to be transmitted by a UE, determining, based on the identified power adjustment value, a set of TPC commands for the uplink transmission, a combination of the set of TPC commands to indicate the power adjustment value to adjust the transmit power for the uplink transmission, and transmitting, to the UE, a set of DCI messages that include the determined set of TPC commands.

An apparatus for wireless communication at a base station is described. The apparatus may include a processor, memory in electronic communication with the processor, and instructions stored in the memory. The instructions may be executable by the processor to cause the apparatus to identify, by the base station, a power adjustment value to adjust a transmit power level of an uplink transmission to be transmitted by a UE, determine, based on the identified power adjustment value, a set of TPC commands for the uplink transmission, a combination of the set of TPC commands to indicate the power adjustment value to adjust the transmit power for the uplink transmission, and transmit, to the UE, a set of DCI messages that include the determined set of TPC commands.

Another apparatus for wireless communication at a base station is described. The apparatus may include means for identifying, by the base station, a power adjustment value to adjust a transmit power level of an uplink transmission to be transmitted by a UE, determining, based on the identified power adjustment value, a set of TPC commands for the uplink transmission, a combination of the set of TPC commands to indicate the power adjustment value to adjust the transmit power for the uplink transmission, and transmitting, to the UE, a set of DCI messages that include the determined set of TPC commands.

A non-transitory computer-readable medium storing code for wireless communication at a base station is described. The code may include instructions executable by a processor to identify, by the base station, a power adjustment value to adjust a transmit power level of an uplink transmission to be transmitted by a UE, determine, based on the identified power adjustment value, a set of TPC commands for the uplink transmission, a combination of the set of TPC commands to indicate the power adjustment value to adjust the transmit power for the uplink transmission, and transmit, to the UE, a set of DCI messages that include the determined set of TPC commands.

In some examples of the method, apparatuses, and non-transitory computer-readable medium described herein, the power adjustment value may be a sum of a set of TPC values for the set of TPC commands.

In some examples of the method, apparatuses, and non-transitory computer-readable medium described herein, determining the set of TPC commands further may include operations, features, means, or instructions for identifying that the UE may be to use a first TPC command of the set of TPC commands as the power adjustment value, and assigning the power adjustment value to be the TPC value for the identified first TPC command based on the identification.

In some examples of the method, apparatuses, and non-transitory computer-readable medium described herein, the set of DCI messages indicate a change in a value of at least one attribute for a UCI, where determining the set of TPC commands may be based on the change in the value of the at least one attribute.

In some examples of the method, apparatuses, and non-transitory computer-readable medium described herein, the at least one attribute of the uplink transmission includes a UCI payload size, or a PUCCH resource assignment, or a PUCCH format, or a PUCCH resource pool, or a combination thereof.

In some examples of the method, apparatuses, and non-transitory computer-readable medium described herein, transmitting the determined set of DCI messages to the UE further may include operations, features, means, or instructions for transmitting at least one uplink DCI message that includes a TPC command for an uplink data channel, the set of TPC commands for the uplink transmission determined based on the TPC command for the uplink data channel.

Some examples of the method, apparatuses, and non-transitory computer-readable medium described herein may further include operations, features, means, or instructions for receiving, from the UE, the uplink transmission transmitted according to the transmit power.

In some examples of the method, apparatuses, and non-transitory computer-readable medium described herein, the UCI includes an acknowledgement on an uplink control channel, or an acknowledgment on an uplink data channel, or an uplink data transmission.

A method of wireless communication is described. The method may include identifying a first uplink communication scheduled to be transmitted at a first transmit power level to a base station according to a first uplink grant, and receiving, from the base station, a second uplink grant for a second uplink communication, the second uplink communication having a higher priority than the first uplink communication. The method may further include determining, based on receiving the second uplink grant, to transmit a first portion of the first uplink communication scheduled to be transmitted at the first transmit power and delay transmission of a second portion of the first uplink communication. The method may further include determining whether to increase the first transmit power level for the first portion of the first uplink communication to a second transmit power level based on determining to transmit the first portion of the first uplink communication.

An apparatus for wireless communication is described. The apparatus may include means for identifying a first uplink communication scheduled to be transmitted at a first transmit power level to a base station according to a first uplink grant, means for receiving, from the base station, a second uplink grant for a second uplink communication, the second uplink communication having a higher priority than the first uplink communication, means for determining, based on receiving the second uplink grant, to transmit a first portion of the first uplink communication scheduled to be transmitted at the first transmit power and delay transmission of a second portion of the first uplink communication, and means for determining whether to increase the first transmit power level for the first portion of the first uplink communication to a second transmit power level based on determining to transmit the first portion of the first uplink communication.

Another apparatus for wireless communication is described. The apparatus may include a processor, memory in electronic communication with the processor, and instructions stored in the memory. The instructions may be operable to cause the processor to identify a first uplink communication scheduled to be transmitted at a first transmit power level to a base station according to a first uplink grant, receive, from the base station, a second uplink grant for a second uplink communication, the second uplink communication having a higher priority than the first uplink communication, determine, based on receiving the second uplink grant, to transmit a first portion of the first uplink communication scheduled to be transmitted at the first transmit power and delay transmission of a second portion of the first uplink communication, and determine whether to increase the first transmit power level for the first portion of the first uplink communication to a second transmit power level based on determining to transmit the first portion of the first uplink communication.

A non-transitory computer-readable medium for wireless communication is described. The non-transitory computer-readable medium may include instructions operable to cause a processor to identify a first uplink communication scheduled to be transmitted at a first transmit power level to a base station according to a first uplink grant, receive, from the base station, a second uplink grant for a second uplink communication, the second uplink communication having a higher priority than the first uplink communication, determine, based on receiving the second uplink grant, to transmit a first portion of the first uplink communication scheduled to be transmitted at the first transmit power and delay transmission of a second portion of the first uplink communication, and determine whether to increase the first transmit power level for the first portion of the first uplink communication to a second transmit power level based on determining to transmit the first portion of the first uplink communication.

Some examples of the method, apparatus, and non-transitory computer-readable medium described herein may further include processes, features, means, or instructions for transmitting the first portion of the first uplink communication at the second transmit power level.

Some examples of the method, apparatus, and non-transitory computer-readable medium described herein may further include processes, features, means, or instructions for limiting the second transmit power level to be no more than a threshold power level.

Some examples of the method, apparatus, and non-transitory computer-readable medium described herein may further include processes, features, means, or instructions for identifying that the second uplink grant was received by the UE less than a threshold amount of time before the first uplink communication may be to be transmitted by the UE. Some examples of the method, apparatus, and non-transitory computer-readable medium described herein may further include processes, features, means, or instructions for transmitting the first portion of the first uplink communication at the first transmit power level.

In some examples of the method, apparatus, and non-transitory computer-readable medium described herein, the threshold amount of time includes a number of symbol periods.

Some examples of the method, apparatus, and non-transitory computer-readable medium described herein may further include processes, features, means, or instructions for identifying that the UE received the second uplink grant more than a threshold amount of time before the first uplink communication may be to be transmitted by the UE. Some examples of the method, apparatus, and non-transitory computer-readable medium described herein may further include processes, features, means, or instructions for transmitting the first portion of the first uplink communication at the second transmit power level.

DETAILED DESCRIPTION

Figure 1:
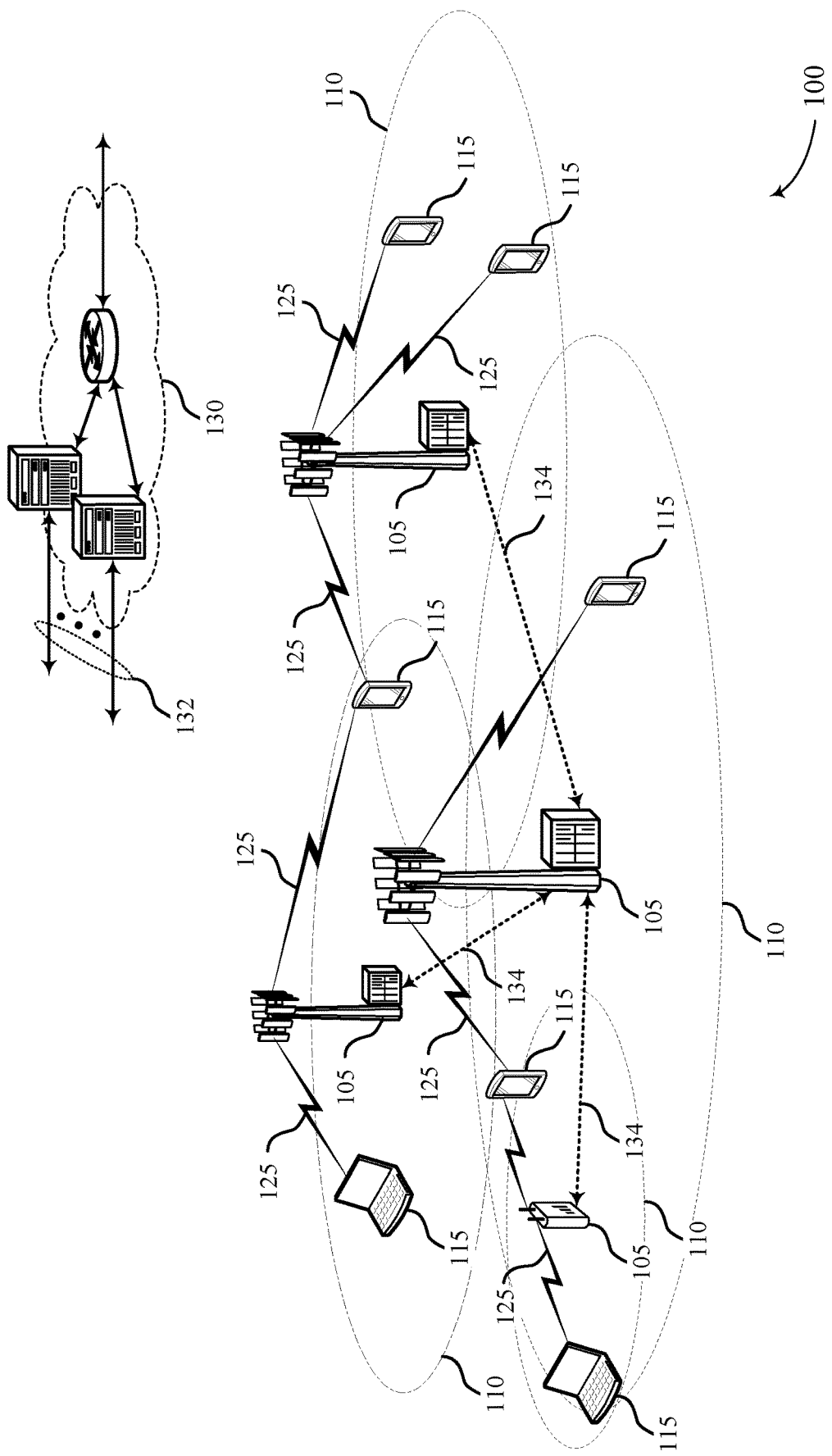
FIG. 1 illustrates an example of a system for wireless communication that supports transmit power control (TPC) command handling across multiple downlink control information (DCI) messages in accordance with aspects of the present disclosure.

Scheduling of resources in wireless communications systems may be based on downlink grants or uplink grants present in downlink control information (DCI) messages provided to a UE by a base station. DCI messages may also include other types of DCI, including transmit power control (TPC) commands for uplink transmissions (e.g., uplink control information (UCI), uplink data transmissions, etc.) by the UE to the base station. Where multiple TPC commands may correspond to a single uplink transmission. Some techniques may restrict each of the TPC commands that correspond to the single uplink transmission to have a same TPC value, and a receiving UE may adjust the transmit power of the uplink transmission based on this common TPC value. However, this rigid requirement may hinder power control performance in such systems. For example, these techniques may be inadequate in wireless communications systems featuring one or more of the following: varying physical uplink control channel (PUCCH) formats, UCI that may have different payload sizes, flexible PUCCH and/or physical uplink shared channel (PUSCH) resource allocations, or flexible or varying configurations of slot and/or mini-slot structures. As such, greater flexibility in handling TPC commands across multiple DCI messages is desired. Improved techniques for handling TPC commands across multiple DCI messages are further described herein.

A user equipment (UE) may use information received in an uplink grant or may use the timing of the uplink grant to determine when to apply a TPC command received from a base station. The UE may receive one or more TPC commands in a DCI message. The DCI message may also include an uplink grant or a downlink grant, or other DCI. The UE may apply the TPC command (e.g., for a physical uplink control channel (PUCCH), for physical uplink shared channel (PUSCH), for acknowledgements (ACKs), etc.) in the same transmission time interval (TTI) in which the grant was received, or the UE may apply the TPC command in a subsequent TTI. In some cases, a TPC command for a PUCCH may be included in a physical downlink shared channel (PDSCH), where the PUCCH may carry an ACK/NACK associated with the PDSCH. Further, multiple PDSCHs may be scheduled with different DCI (e.g., multiple DCI may include different TPC commands), and the multiple PDSCHs may be ACK'd on the same PUCCH (e.g., the PUCCH may be associated with different TPC commands). The techniques described herein may provide for TPC handling across multiple DCI. These techniques may provide increased scheduling flexibility (e.g., for PUCCH formats, uplink control information (UCI) payloads, PUCCH/PUSCH resource allocation, etc.), finer tuning of transmit power, improved discontinuous transmission (DTX) functionality, and so on.

Multiple TPC commands received in multiple DCI may be handled according to techniques described herein. In some cases, when multiple TPC commands apply to an uplink transmission (e.g., uplink control information), individual steps (e.g., each TPC command) may be considered (e.g., added, averaged, etc.) to determine the final TPC command for the uplink transmission. Such techniques may enable finer tuning of transmission power, as multiple TPC commands may be used to control the transmission power with finer granularity.

In other examples, when multiple TPC commands apply to the same uplink transmission, the most recent TPC command may be applied to the uplink transmission. In some cases, multiple TPC commands may nominally be consistent (e.g., be the same) for a certain uplink transmission such that a varying TPC command may indicate a change to one or more pre-defined attributes of the associated uplink transmission (e.g., a DCI or TPC change for an uplink transmission may indicate a transmission attribute change). In some cases, a value for such an attribute may be included in one or more of the multiple DCI messages (e.g., the change in an attribute of the UCI may be identified based on the received value for the attribute). This attribute value may enable increased control of uplink transmission attributes (e.g., increased flexibility to control or update transmission power, change resource assignments, alter UCI payload, etc.).

In some cases, TPC commands may be modified based on grants indicating discontinuous transmission (DTX). For example, DCI may schedule an uplink transmission and may include a TPC command for that uplink transmission. A later DCI may then schedule a partially overlapping uplink transmission of higher priority (e.g., a low latency or mission critical transmission), causing a partial DTX of the first uplink transmission. In such cases, TPC may be modified to account for the power loss from the DTX, and the transmit power for the non-DTX'd portion of the transmission may increase. Therefore, the total power of the original uplink transmission (e.g., that was DTX'd) may remain similar to the power level in the absence of DTX. Such techniques may reduce occurrence of power spectral density (PSD) related issues at a wireless device receiving the uplink transmission (e.g., at a base station expecting a DTX'd transmission to be associated with a higher power level).

Aspects of the disclosure are initially described in the context of a wireless communications system. Example transmission power adjustment schemes, DTX handling schemes, and TPC handling process flows are then described. Aspects of the disclosure are further illustrated by and described with reference to apparatus diagrams, system diagrams, and flowcharts that relate to TPC command handling across multiple DCI messages.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes multiple bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a number of antenna elements of an antenna array, or by processing received signals according to different receive beamforming weight sets applied to signals received at a number of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A physical downlink control channel (PDCCH) may carry DCI in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, hybrid automatic repeat request (HARQ) information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. DCI size and format may depend on the amount of information as well as factors such as bandwidth, the number of antenna ports, and duplexing mode.

In some examples, an enhanced PDCCH (EPDCCH) may be employed. For example, a control channel may be frequency division multiplexed within a carrier bandwidth and may span the duration of several TTIs. EPDCCH may be characterized by enhanced control channel elements (ECCEs). An ECCE may have a different number of REGs than a control channel element (CCE), and the REGs may or may not be contiguous.

The PUCCH may be mapped to a control channel defined by a code and two consecutive resource blocks. Uplink control signaling may depend on the presence of timing synchronization for a cell. PUCCH resources for scheduling request (SR) and channel quality indicator (CQI) reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through a RACH (i.e., synchronized UEs may or may not have a dedicated SR channel). PUCCH resources for SR and CQI may be lost when the UE is no longer synchronized.

A base station 105 may gather channel condition information from a UE 115 in order to efficiently schedule the channel. This information may be sent from the UE 115 in the form of a channel state report. A channel state report may contain an rank indicator (RI) requesting a number of layers to be used for downlink transmissions (e.g., based on the antenna ports of the UE 115), a precoding matrix indicator (PMI) indicating a preference for which precoder matrix should be used (based on the number of layers), and a CQI representing the highest MCS that may be used. CQI may be calculated by a UE 115 after receiving predetermined pilot symbols such as a cell-specific reference signal (CRS) or channel state information reference signal (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional aperiodic reports as needed. Aperiodic reports may include wideband reports indicating the channel quality across an entire cell bandwidth, UE selected reports indicating channel quality of a subset of the cell bandwidth, or of particular sub-bands, or configured reports in which the sub-bands reported are selected by the base station 105.

A UE 115 may coordinate transmission power with a serving base station 105 to mitigate interference, improve the uplink data rate, and prolong battery life. Uplink power control may include a combination of open-loop and closed-loop mechanisms. In open-loop power control, the UE transmission power may depend on estimates of the downlink path-loss and channel configuration. In closed-loop power control, the UE transmission power may be controlled or adjusted using explicit power-control commands from the network. Open-loop power control may be used for initial access, whereas both open and closed loop control may be used for uplink control and data transmission. A UE 115 may determine power using an algorithm that takes into account a maximum transmission power limit, a target base station receive power, path loss, MCS, the number of resources used for transmission, and the format of the transmitted data (e.g., a PUCCH format). That is, the UE 115 may transmit an indication to the base station 105 regarding an amount of transmission power left for the UE 115 to use in addition to power being used for a current transmission (e.g., a PHR). Power adjustments may be made by a base station 105 using TPC messages, which may incrementally adjust the transmission power of a UE 115, as appropriate.

A UE 115 may also provide reports to the base station regarding transmission power or data that the UE 115 may transmit. For example, the UE 115 may transmit an indication to the base station 105 regarding an amount of transmission power left for the UE 115 to use, in addition to an amount of transmission power being used for a current transmission (e.g., a power headroom report (PHR)). Additionally, the UE 115 may send a buffer status report (BSR) to the base station 105 indicating an amount of buffered data at the UE 115 that is pending transmission.

Wireless communications system 100 may apply transmission power control commands (e.g., TPC commands) and transmission of uplink control information (UCI) (e.g., carried on a PUCCH or carried on a PUSCH) based on a received DCI message (e.g., which may also include one or more uplink and/or downlink grants). For example, a UE 115 may receive a DCI message from a base station 105 during a TTI (e.g., a subframe). The DCI message may include a TPC command, which the UE 115 may apply to a subsequent TTI. The subsequent TTI may include resources allocated by a grant of the DCI message and used by the UE 115 to transmit to a base station 105. The UE 115 may also apply the TPC to a TTI a number of TTIs after the DCI message is received. In some cases, the UE 115 may receive a trigger in a DCI message as part of a two-stage grant, and the application of the TPC and the transmission on the allocated resources may be based on the trigger.

Figure 2:
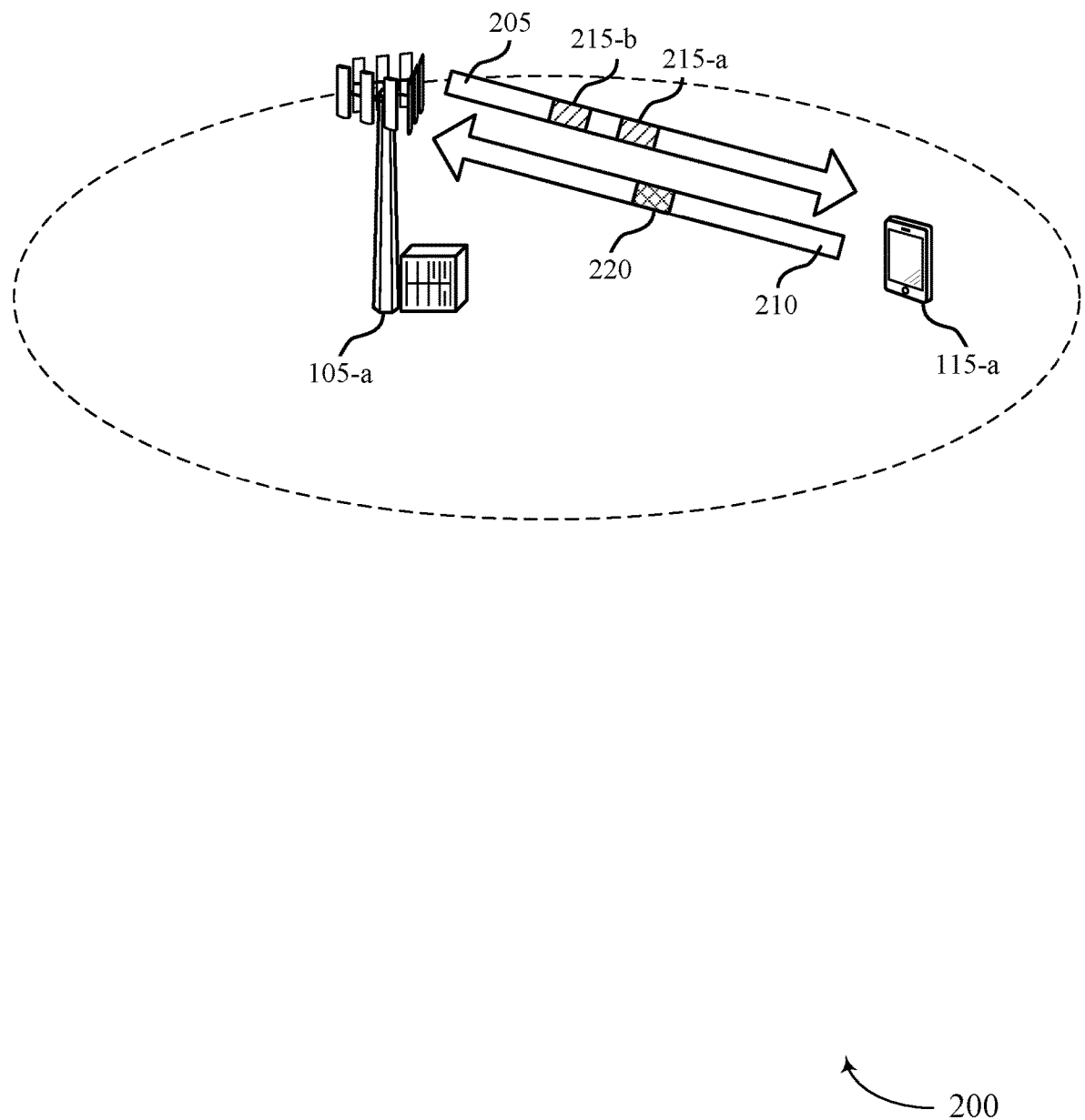
FIG. 2 illustrates an example of a wireless communications system that supports TPC command handling across multiple DCI messages in accordance with aspects of the present disclosure.

FIG. 2 illustrates an example of a wireless communications system 200 that supports TPC command handling across multiple DCI messages in accordance with various aspects of the present disclosure. In some examples, wireless communications system 200 may implement aspects of wireless communication system 100. The wireless communications system 200 may include a base station 105-*a* and UE 115-*a*, which may be examples of the corresponding devices as described with reference to FIG. 1.

Wireless communications system 200 may support downlink communications 205 from base station 105-*a* to UE 115-*a*, and uplink communications 210 from UE 115-*a* to base station 105-*a*. A downlink transmission (e.g., downlink communications 205) may include DCI message 215. DCI message 215 may include information regarding uplink grants, uplink power control, downlink grants, scheduling assignments, and transmission schemes. For example, DCI message 215 may include TPC information (e.g., TPC messages, TPC commands, etc.) for subsequent uplink communications 210. That is, DCI message 215 may include TPC commands for an uplink control information 220. Uplink control information 220 may be sent on a PUCCH or a PUSCH, for example in the case of UCI-on-PUSCH, and may include a PUCCH ACK (e.g., PUCCH carrying ACK), or an ACK sent on PUSCH, etc. In cases where DCI message 215 includes a downlink grant and points to (e.g., includes TPC commands for) a PUCCH (e.g., for an ACK corresponding to the PDSCH resources indicated by the grant), DCI message 215 may be referred to as downlink DCI. In cases where DCI message 215 includes an uplink grant and points to (e.g., includes TPC commands for) PUSCH, DCI message 215 may be referred to as uplink DCI. In some examples, DCI message 215 may be included in PDCCH (e.g., downlink communications 205 may include PDCCH, an uplink grant, a downlink grant, etc., which may include DCI message 215). DCI message 215 may also include control information for PDSCH (e.g., other downlink communications) and/or uplink transmissions such as PUCCH, PUSCH, etc.

In some cases, when multiple TPC commands apply to an uplink transmission (e.g., uplink control information), individual steps (e.g., each TPC command) may be considered (e.g., added, averaged, etc.) to determine a final, effective TPC command for the uplink transmission. Applying multiple TPC commands may enable finer tuning of transmission power, and may be used to control the transmission power for UCI with finer granularity. In other cases, a change in DCI or a different TPC command for an uplink transmission may update a previous TPC command for the uplink transmission, or may indicate a change to some transmission attribute of the uplink transmission. Such may enable increased control of uplink transmission attributes (e.g., increased flexibility to control or update transmission power, PUCCH formats, UCI payload, PUCCH resource allocations, PUSCH resource allocations, slot or mini-slot structure or formats, etc.). In some cases, the TPC in multiple DCI corresponding to an uplink control information may be restricted to be the same TPC.

In the example of FIG. 2, base station 105-*a* may transmit downlink communications 205 which UE 115-*a* may be acknowledge (e.g., with an ACK or negative acknowledgement (NACK)) via uplink communications 210. For example, uplink communications 210 may include feedback uplink control information 220, which may include an ACK corresponding to one or more transmissions on the PDSCH received from the base station 105-*a*. The base station 105-*a* may include DCI messages 215 (which may be multiple DCI messages, including at least DCI message 215-*a*, DCI message 215-*b*, etc.) in PDCCH and/or PDSCH (e.g., downlink communications 205) which may include TPC commands that indicate to the UE 115-*a* what power to use for uplink control information 220. In some cases, the uplink control information 220 may correspond to multiple downlink transmissions (e.g., uplink control information may include multiple ACKs for multiple PDSCH transmissions), and each downlink transmission may correspond to a DCI. As such, uplink control information 220 may be associated with multiple DCI messages (e.g., and multiple TPC commands). In some cases, the multiple TPC commands may indicate the same transmit power change information for the uplink control information 220. In other cases, the multiple TPC commands may differ (e.g., identify different transmit power change amounts), and the UE 115-*a* may handle the multiple TPC commands for the uplink control information 220 as described herein.

A UE 115-*a* receiving multiple TPC commands (e.g., across multiple DCI messages 215) for an uplink transmission may use an effective TPC as a function of the multiple TPC commands received. For example, base station 105-*a* may send TPC commands indicating to UE 115-*a* to alter transmission power (e.g., to increase or decrease transmission power). Therefore, the UE 115-*a* may use multiple TPC commands cumulatively. The UE 115-*a* may add together the TPC commands associated with an uplink transmission, and may use the sum as the effective TPC command for the uplink transmission (e.g., the UE 115-*a* may accumulate or add TPC commands from multiple DCI messages 215 associated with some transmission of uplink control information 220). If TPC is configured in accordance with such an accumulation mode, UE 115-*a* may perform a step-by-step power adjustment based on a power of previous transmission. For instance, each TPC may signal a power step relative to the previous TPC, which may allow for finer tuning of transmit power.

In the accumulation mode for TPC, if UE 115-*a* receives a first TPC command signaling a power offset of +1 dB and, in a subsequent DCI message 215, receives a second TPC command signaling a power offset of +3 dB, UE 115-*a* may apply a power offset corresponding to the sum of the two power offsets (i.e., +4 dB). As another example, a UE 115-*a* may receive a TPC command signaling a power offset of 0 dB (e.g., no change to previous power), such that base station 105-*a* may schedule the intended TPC in a first DCI message 215, and may set TPC=0 dB in subsequent DCI messages 215 associated with the same uplink transmission unless the original TPC command may be changed or updated. Further, utilization of multiple TPC commands via multiple DCI messages 215 may allow for different interpretation of step-size from one TPC command to the next, enabling tuning of power with finer granularity. For example, reducing the step-size may result in the same range of power control achievable with greater granularity. In some cases, the step-size may be a function of the number of DCI pointing to the same uplink transmission (e.g., which the UE may determine using downlink assignment index (DAI)). For example, if three DCI messages 215 point to an uplink transmission, each may be interpreted as +⅓ dB tuning, or the first may be interpreted as +1 dB tuning, the second may be interpreted as +⅓ dB tuning, and the third may be interpreted as −⅓ dB tuning, etc. Such techniques may provide the base station 105-*a* more flexibility to modify the TPC as further DCI messages 215 are scheduled.

In some cases, the most recent TPC command may be used as the effective TPC for the uplink transmission. For example, the base station 105-*a* may use subsequent DCI messages 215 to update or change a previous TPC command for a given uplink transmission. The previous TPC commands may be effectively ignored by the UE 115-*a*, and the most recent TPC command may be used for the transmission power of the uplink control information 220. As discussed herein, a varying TPC command or DCI message, a differing TPC command or DCI message, an updated TPC command or DCI, etc. may refer to a change from a previous TPC command or DCI message in the context of the multiple TPC commands or DCI messages associated with some uplink transmission (e.g., subsequent DCI indicating a different TPC command for the uplink transmission than previously indicated for the uplink transmission in previous DCI). Such changes or differing TPC commands may be used to update or otherwise change a power level, tune a power lever, indicate a change in other transmission attributes, etc.

In some examples, multiple TPC commands for an uplink transmission may nominally or generally be constrained or restricted to be the same (e.g., indicate the same power control information) in some or most circumstances, but may be allowed to vary under certain conditions. For example, a DCI message 215 indicating a change in TPC for an uplink transmission may change one or more pre-defined attributes of the associated uplink transmission. An uplink control information (UCI) payload (e.g., uplink control information 220 payload) may increase beyond a threshold, which may result in an updated TPC command from base station 105-a. In some examples, the UCI payload may be transmitted over a PUSCH or a PUCCH. If more packets are to be ACK'd, or due to aperiodic CQI feedback trigger causing CQI symbols to be included with the ACK payload, the UCI payload may increase and a TPC command may indicate increased power for the transmission. Further, if the PUCCH resource assignment changes (e.g., the number of resource blocks, the number of orthogonal frequency division multiplexing (OFDM) symbols, etc.) the TPC command may be updated in a subsequent DCI message 215 for the uplink transmission. Additionally or alternatively, if the PUCCH format or resource-pool changes, the TPC command may be updated in a subsequent DCI message 215 for the uplink transmission. If DCI messages 215 indicating a change in TPC does not follow these rules, the new or different TPC command may in some cases be ignored by the UE 115-a. For example, the differing TPC command may be treated as a false cyclic redundancy check (CRC) pass on decoding of the DCI message 215, where one of the DCI messages having a different TPC command than the other DCI messages for the same uplink communication may indicate that the TPC command of that DCI message is in error.

In some cases, techniques described herein may apply to UCI on PUSCH transmissions (e.g., UCI piggybacked on PUSCH). For example, multiple downlink DCI (e.g., DCI for PDSCH) pointing to uplink control information (e.g., an ACK to be sent on a PUCCH, which may be referred to as a PUCCH ACK), together with uplink DCI (e.g., DCI for PUSCH) pointing to PUSCH transmission, may indicate that the ACK is to be sent using UCI on PUSCH. TPC commands pointing to PUCCH ACK may be added to the PUSCH TPC (e.g., included with the uplink DCI). In some cases, TPC pointing to PUCCH ACK may be ignored. In other cases, the most recent TPC command may be applied.

In some cases, the transmit power for uplink communications may be modified based on DTX transmission of the uplink communication by a UE 115. For example, DCI may schedule an uplink transmission which may include a TPC command. A later DCI message may then schedule a partially-overlapping uplink transmission of higher priority (e.g., a low latency or mission critical transmission, or other ultra-low latency type transmission), causing partial DTX of the first uplink transmission. In such cases, the transmit power for the discontinuously transmitted (DTX'd) uplink transmission may be modified to account for the power loss from the DTX'd portion of the uplink transmission (e.g., either delayed or dropped), and the transmit power for the non-DTX'd portion of the transmission may be increased. Therefore, the total power of the original uplink transmission (e.g., that was DTX'd) may remain similar to the power level in the absence of DTX. Such techniques may reduce occurrence of power spectral density (PSD) related issues at a wireless device receiving the uplink transmission (e.g., at a base station expecting a DTX'd transmission to be associated with a higher power level). In some cases, such TPC modification may be subject to an availability of UE power headroom. Applicability of such TPC modification (e.g., power boosting) may also be limited based on relative timing of the two DCI grants scheduling the overlapping uplink transmission and the corresponding transmissions. For example, if the later grant arrives too late, the first uplink transmission may have already begun (e.g., the ongoing first uplink transmission may not be able to change its power during the transmission even though part of it will be lost to DTX). Such changes in power may result in loss of phase coherence for the uplink transmission between before and after the change. Therefore, there may need to be enough time for the UE 115-a to react to the partial DTX and apply corresponding power boosting (e.g., modify the TPC accordingly). In some cases, a minimum advance notification may be imposed (e.g., the second grant indicating the partial DTX should not arrive later than some minimum time before the start of the first transmission, for example, no later than a minimum number of OFDM symbols before the start of the transmission. In some examples, this minimum may be the same as the minimum number of OFDM symbols used between an uplink grant and the corresponding uplink transmission or between a PDSCH and its corresponding ACK on the uplink, as further described with reference to FIG. 4.

In some examples, UE 115-a may use uplink grants to determine when to apply a transmission power control received from base station 105-a. In some cases, the grant may provide a transmission timeline for the uplink transmission. That is, an assignment of resources to UE 115-a may specify a timeline for TPC. In such cases, the timeline between when a grant is received and when UE 115-a applies the TPC for uplink transmissions may be variable (e.g., not fixed) for different resource assignments. UE 115-a may alternatively apply the TPC command in a subsequent subframe according to some predetermined rule (e.g., subframe n+4 if the grant is received in subframe n), where the TPC may be applied in that subframe (e.g., subframe n+4) and in subsequent transmissions, even if the uplink transmission corresponding to that grant does not occur until a later time (e.g., after subframe n+4).

Figure 3:
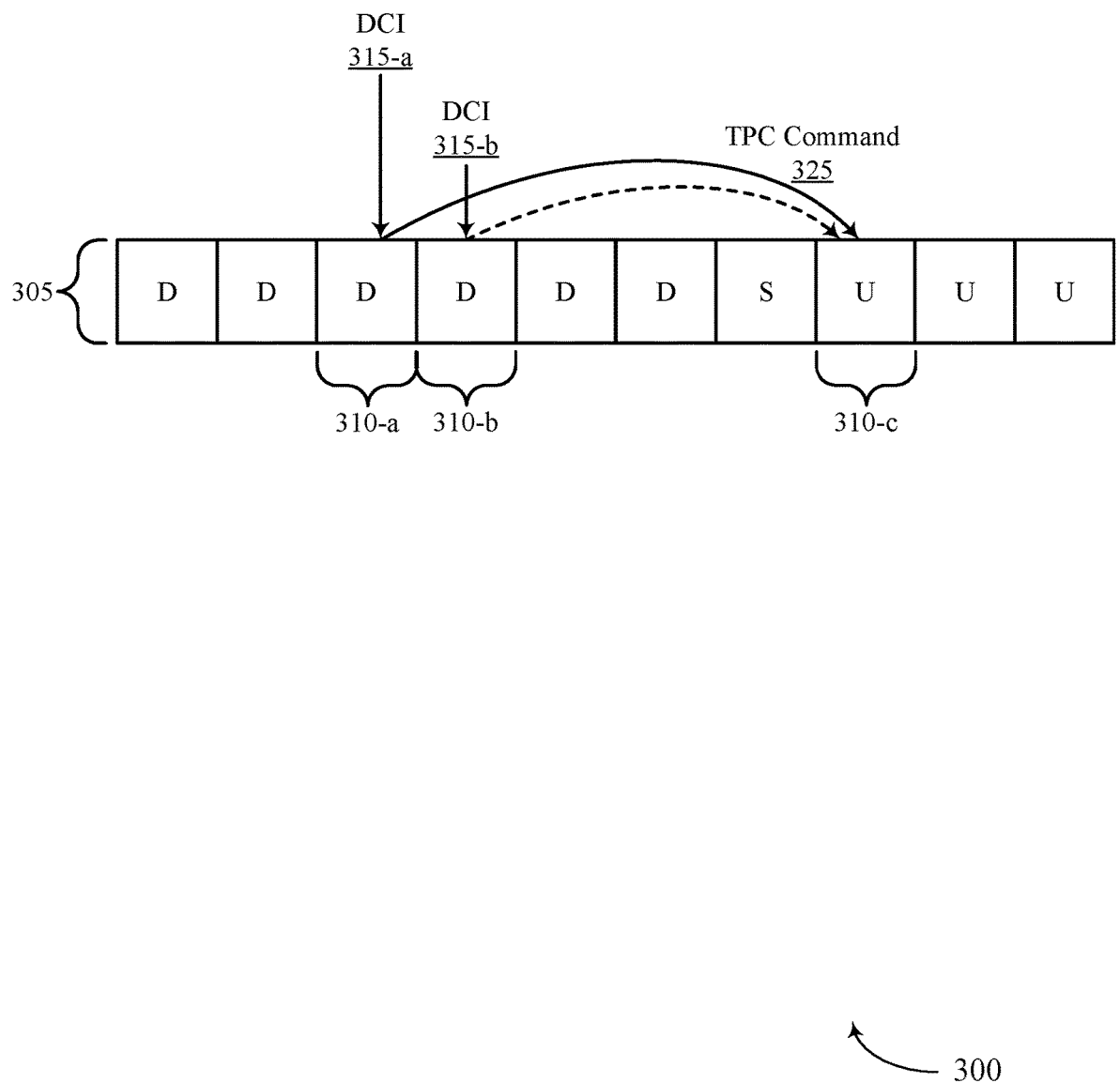
FIG. 3 illustrates an example of a transmission power adjustment scheme that supports TPC command handling across multiple DCI messages in accordance with aspects of the present disclosure.

FIG. 3 illustrates an example of a transmission power adjustment scheme 300 that supports TPC command handling across multiple DCI messages in accordance with various aspects of the present disclosure. In some examples, transmission power adjustment scheme 300 may implement aspects of wireless communication system 100. Transmission power adjustment scheme 300 may be utilized by a UE 115 as described with reference to FIGS. 1 and 2. For example, a UE 115 may adjust a transmission power based on one or more TPC commands 325 included in received DCI messages 315 according to transmission power adjustment scheme 300.

Transmission power adjustment scheme 300 may include a frame 305 that includes a number of TTIs 310 (e.g., subframes), that are used for communication between a UE 115 and a base station 105. For example, frame 305 may include a number of TTIs 310 (e.g., a TTI 310-*a*, a TTI 310-*b*, a TTI 310-*c*, and so on) that are used for downlink transmissions from the base station 105 and uplink transmissions from the UE 115. Additionally, frame 305 may include a number of different carriers or tones that may be used for uplink and downlink communications in a shared or unlicensed spectrum. In some cases, a base station may transmit multiple downlink transmissions (e.g., a PDSCH during TTI 310-*a* and a PDSCH during TTI 310-*b*) that may each be scheduled with different DCI messages (e.g., may each contain a TPC command 325). In response, a UE may transmit uplink feedback information (e.g., ACK/NACK) in a single PUCCH for the multiple received PDSCH transmissions (e.g., the UCI payload of a PUCCH or the UCI piggybacked on PUSCH and transmitted during TTI 310-*c* may include ACKs for transmissions received during TTI 310-*a* and TTI 310-*b*, which may include some combination of PDSCH transmissions, uplink/downlink grants, etc.).

A UE 115 may receive a first DCI message 315-*a* during the TTI 310-*a*, and the DCI message 315-*a* may include a transmit power command (e.g., a TPC command 325) from a base station 105. In some cases, the DCI (e.g., DCI message 315-*a*) may further include an assignment of resources that the UE 115 may use to transmit to the base station 105. The DCI message 315-*a* may also include timing information or an indication of timing for a subsequent TTI 310. The timing information may indicate to the UE 115 when a subsequent TTI 310 for uplink communications occurs. Based on the received DCI messages and the assignment of resources, the UE 115 may apply the TPC command 325 during the TTI 310-*c* for an uplink transmission (e.g., which may include uplink control information, ACK, etc. in response to a PDCCH carrying the DCI or TPC command). That is, the TPC command 325 may be applied in the subframe used for uplink transmissions by the UE 115, where the subframe used for uplink transmissions may include the resources assigned by the received DCI (e.g., at time specified by the resource assignment).

Additionally, UE 115 may receive a second DCI message 315-*b* during the TTI 310-*b*, and the DCI message 315-*b* may include a second transmit power command (e.g., a TPC command 325) from a base station 105. In some cases, the second TPC command may differ from or be consistent with the first TPC command, and may be handled by the UE according to the techniques described herein. In some cases, the DCI message 315-*b* may further include an assignment of resources that the UE 115 may use to transmit to the base station 105. The DCI message 315-*b* may also include timing information or an indication of timing for a subsequent TTI 310. The timing information may indicate to the UE 115 when a subsequent TTI 310 for uplink communications occurs.

Based on the received DCI messages and the assignment of resources, the UE 115 may apply the multiple TPC commands 325 during the TTI 310-*c* for an uplink transmission (e.g., which may include uplink control information, ACK, etc. in response to a PDCCH carrying the DCI or TPC command). That is, the TPC commands 325 may be applied in the subframe used for uplink transmissions by the UE 115, where the subframe used for uplink transmissions includes the resources assigned by the one or more received DCI (e.g., at time specified by the resource assignment). The multiple TPC commands may be handled in accordance with the techniques described herein (e.g., with reference to FIGS. 1 and 2).

Figure 4A:
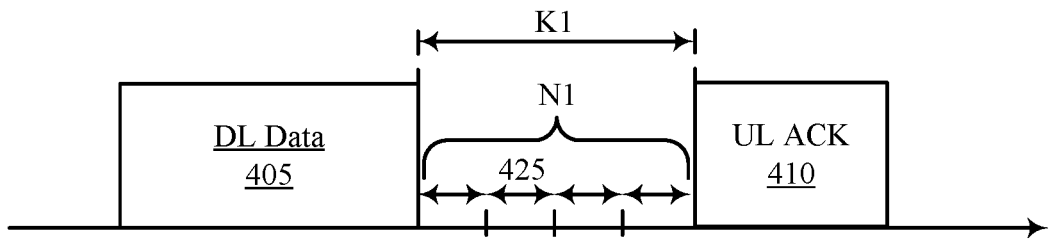
FIGS. 4A and 4B illustrate aspects of discontinuous transmission (DTX) handling schemes that support TPC command handling across multiple DCI messages in accordance with aspects of the present disclosure.
Figure 4B:
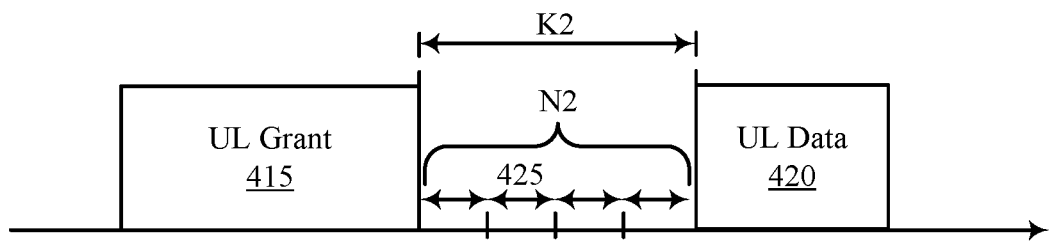

FIGS. 4A and 4B illustrate aspects of TPC modification and handling of DTX scenarios. DTX handling scheme 400 and DTX handling scheme 401 may support TPC command handling across multiple DCI messages in accordance with various aspects of the present disclosure. In some examples, DTX handling scheme 400 and DTX handling scheme 401 may implement aspects of FIGS. 1-3.

FIGS. 4A and 4B may illustrate aspects of DCI grants scheduling overlapping uplink transmissions, and how a UE 115 may modify TPC (e.g., power boost) a transmission that has been DTX'd (e.g., discontinued or interrupted by a prioritized transmission). In such cases, a first grant may indicate resources and a TPC command for a first transmission, and a second grand may indicate resources and a TPC command for a second transmission that overlaps in time with a portion of the first transmission. In some cases, the second transmission may be a low latency transmission, mission critical transmission, or some other transmission with a higher priority than the first transmission.

For example, DCI may schedule an uplink transmission and may include a TPC command for the uplink transmission. A later DCI may then schedule a partially overlapping uplink transmission of higher priority causing partial DTX of the first uplink transmission. In such cases, TPC may be modified to account for the power loss from the DTX, and the transmit power for the non-DTX'd portion of the transmission may be increased. Therefore, the total power of the original uplink transmission (e.g., that was DTX'd) may remain similar to the power level in the absence of DTX (e.g., the power boosting of the remaining portion of the discontinued transmission may account for the power no longer being provided for the discontinued portion of the DTX'd transmission). Such techniques may reduce occurrence of power spectral density (PSD) related issues at a wireless device receiving the uplink transmission (e.g., at a base station expecting a DTX'd transmission to be associated with a higher power level).

In some cases, such TPC modification may be subject to availability of UE power headroom. Applicability of such TPC modification (e.g., power boosting) may be limited based on relative timing of the two DCI grants scheduling the overlapping uplink transmission and the corresponding transmissions. For example, if the later grant arrives too late, the first uplink transmission may have already begun (e.g., the ongoing first uplink transmission may not be able to change its power during the transmission even though part of it will be lost to DTX). Such changes in power may result in loss of phase coherence for the uplink transmission before and after the change. Therefore, there may need to be enough time for the UE 115-*a* to react to the partial DTX and apply corresponding power boosting (e.g., modify the TPC accordingly). In some cases, a minimum advance notification may be imposed (e.g., the second grant indicating the partial DTX should not arrive later than some minimum number of OFDM symbols before the start of the transmission.

FIGS. 4A and 4B illustrate aspects of such minimum requirements for TPC modification in DTX scenarios. That is, a minimum for TPC modification may be similar to the minimum number of OFDM symbols 425 required between and uplink grant 415 and the corresponding transmission of uplink data 420 (e.g., K2 or N2 capability) or between a PDSCH (e.g., downlink data 405) and its corresponding uplink ACK 410 (e.g., K1 or N1 capability). K1 may show the timing between downlink data 405 to uplink ACK 410 (e.g., in terms of slots). K2 may show the timing between uplink grant 415 and uplink data 420 (e.g., in terms of slots). N1 may refer to the number of OFDM symbols 425 required for UE 115 processing from the end of PDSCH reception (e.g., reception of downlink data 405) to the earliest possible start of the corresponding uplink ACK/NACK transmission (e.g., uplink ACK 410) from the UE 115 perspective. N2 may refer to the number of OFDM symbols 425 required for UE 115 processing from the end of PDCCH containing the uplink grant 415 reception to the earliest possible start of the corresponding uplink PUSCH transmission (e.g., uplink data 420) from the UE 115 perspective. The example of FIGS. 4A and 4B illustrates N1 and N2 equaling four OFDM symbols 425, which is shown for exemplary purposes only. N1, N2, K1, and K2 may have different values, as they may depend on UE 115 capability. UE 115 may employ TPC modification techniques (e.g., power boosting, PSD correction, etc.) in scenarios where timing of the second grant (e.g., the grant for the prioritized transmission resulting in DTX of the first transmission) enables the UE 115 to do so.

That is, TPC modification techniques for a DTX'd transmission may be employed when the number of symbols between downlink data 405 (e.g., indicating the prioritized second transmission and DTX of the first transmission) and the uplink ACK 410 (e.g., the DTX'd transmission) is not less than N1. Additionally, TPC modification techniques for a DTX'd transmission may be employed when the number of symbols between an uplink grant 415 (e.g., indicating the prioritized second uplink transmission and DTX of the first transmission) and the uplink data 420 (e.g., the DTX'd transmission) is not less than N2. In DTX scenarios where there is sufficient timing/OFDM symbols (e.g., not less than K1 and N1/K2 and N2) between downlink data 405/uplink grant 415 and uplink ACK 410/uplink data 420, TPC modification may be employed.

Figure 5:
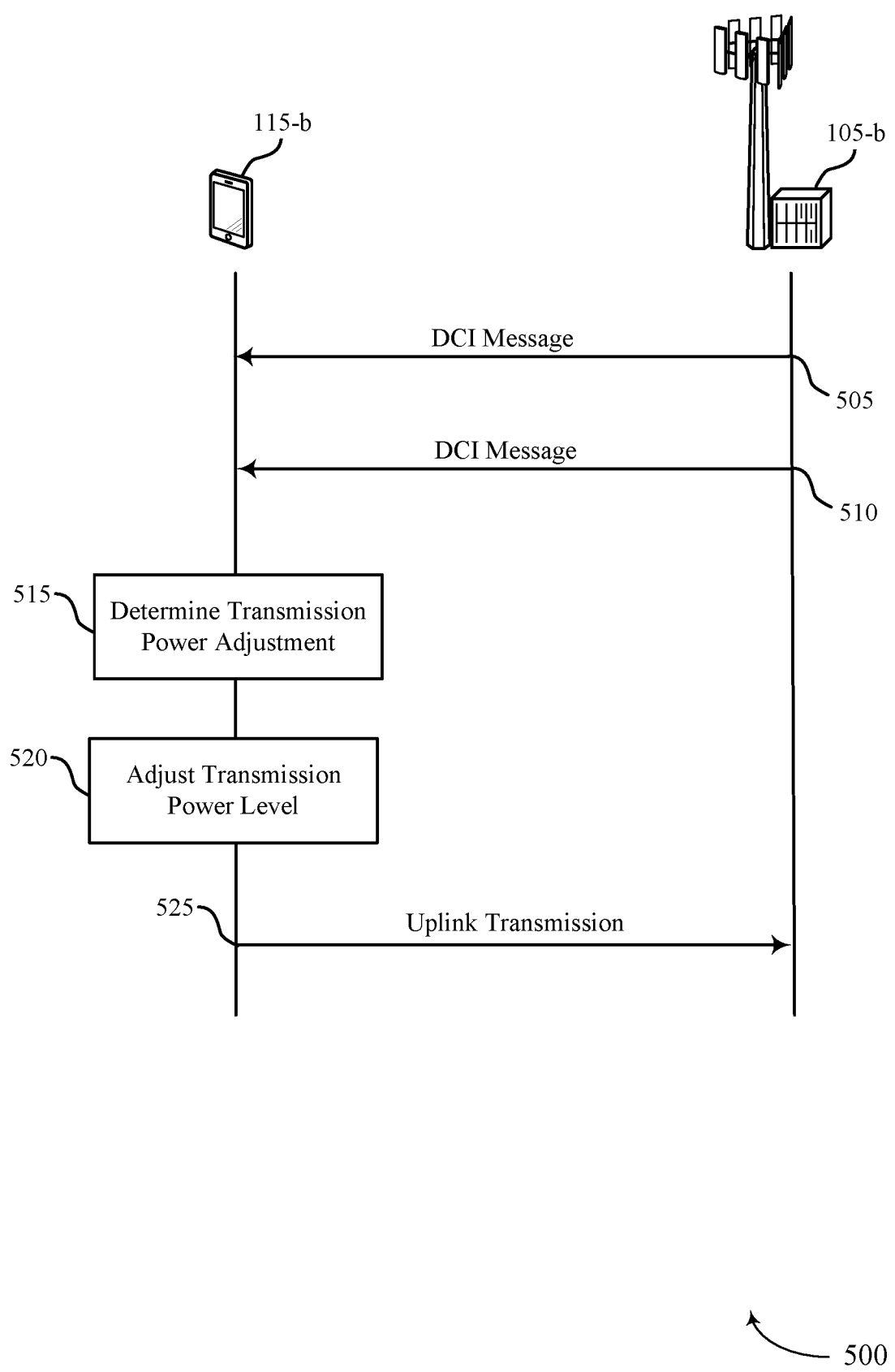
FIG. 5 illustrates an example of a process flow that supports TPC command handling across multiple DCI messages in accordance with aspects of the present disclosure.

FIG. 5 illustrates an example of a process flow 500 that supports TPC command handling across multiple DCI messages in accordance with various aspects of the present disclosure. In some examples, process flow 500 may implement aspects of wireless communication system 100.

At 505, base station 105-b may transmit a first DCI message to UE 115-b. The DCI message may include a TPC command for a UCI, an uplink data transmission, or other uplink transmission.

At 510, base station 105-b may transmit a second DCI message to UE 115-b. The DCI message may include a second TPC command for uplink transmission (e.g., the UCI or uplink data transmission).

At 515, UE 115-b may determine a power adjustment value for the transmission of the uplink transmission based on a combination of the TPC commands included in the DCI messages received at 505 and 510. In some cases, the power adjustment value may include a sum of the TPC commands received at 505 and 510. In other cases, the power adjustment value may correspond to the most recently received TPC command (e.g., the TPC command received at 510). In some cases, each TPC value received may be scaled based on the number of TPC commands received.

In some cases, the UE 115-b may additionally or alternatively receive a value for an uplink transmission attribute in the DCI messages received at 505 and 510, where the change in the attribute of the uplink transmission is identified based on the received value for the attribute. In some cases, the attribute of the uplink transmission may include a UCI payload size, or a physical uplink control channel (PUCCH) resource assignment, or a PUCCH format, or a PUCCH resource pool, or a combination thereof.

At 520, UE 115-b may adjust the transmission power level for the uplink transmission (e.g., UCI, uplink data transmission, etc.) based on the determined power adjustment value.

At 525, UE 115-b may transmit the uplink transmission to base station 105-b (e.g., at the adjusted transmit power level).

Figure 6:
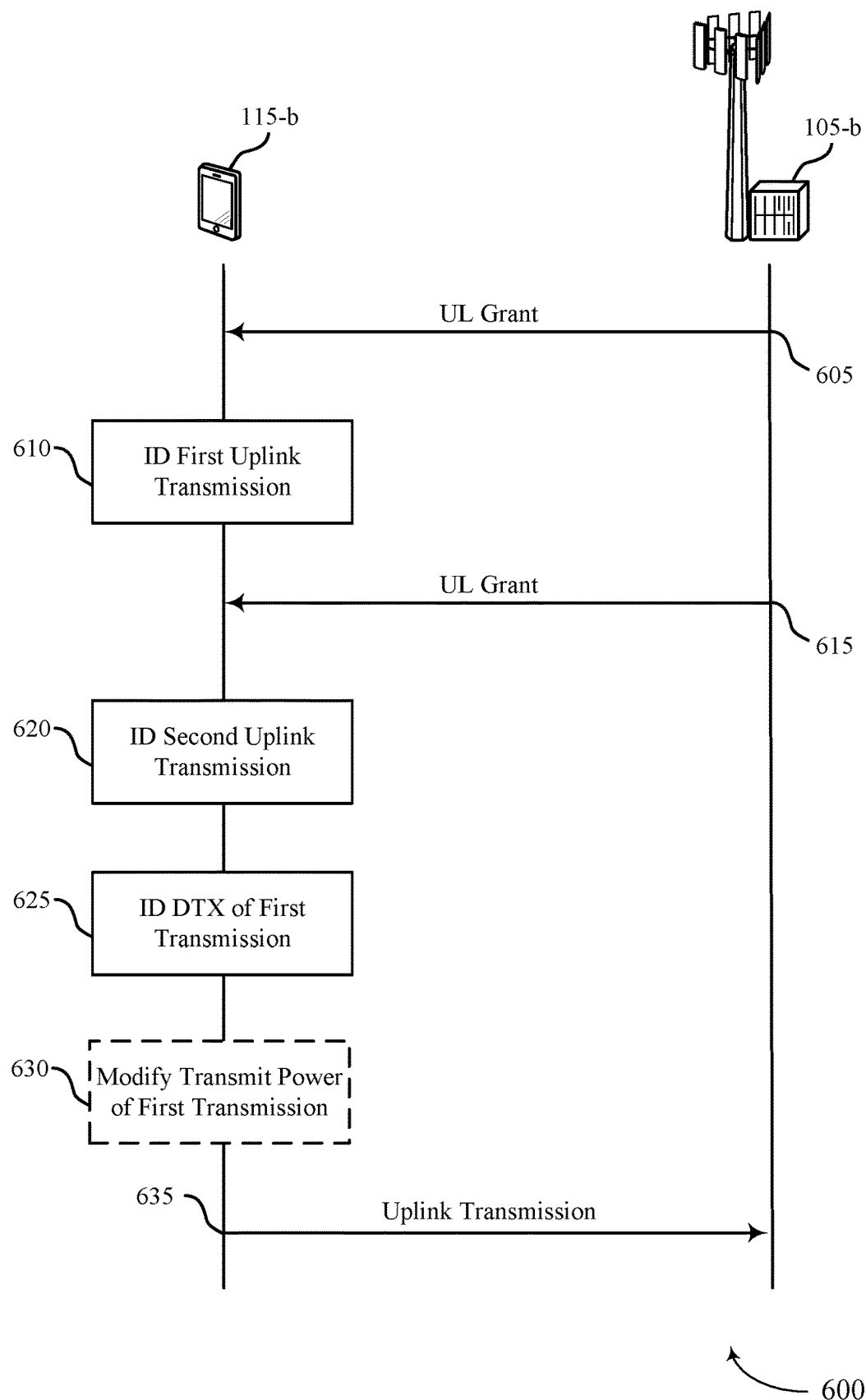
FIG. 6 illustrates an example of a process flow that supports TPC command handling across multiple DCI messages in accordance with aspects of the present disclosure.

FIG. 6 illustrates an example of a process flow 600 that supports TPC command handling across multiple DCI messages in accordance with various aspects of the present disclosure. In some examples, process flow 600 may implement aspects of wireless communication system 100.

At 605, base station 105-b may transmit a first uplink grant to UE 115-b. The uplink grant may include a TPC command for a first uplink communication (e.g., a first uplink transmission).

At 610, UE 115-b may identify a first uplink communication scheduled to be transmitted at a first transmit power level to base station 105-b, according to the grant received at 605.

At 615, UE 115-b may receive a second uplink grant for a second uplink communication, the second uplink communication having a higher priority than the first uplink communication.

At 620, UE 115-b may identify the timing of a second uplink transmission (e.g., a higher priority transmission), which may overlap with a portion of the first transmission identified at 610.

At 625, UE 115-b may transmit a first portion of the first uplink communication scheduled to be transmitted at the first transmit power and may delay transmission of a second portion of the first uplink communication based on identifying the overlap of the prioritized second transmission and the first transmission.

At 630, UE 115-b may determine whether to increase the first transmit power level for the first portion of the first uplink communication to a second transmit power level based on determining to transmit the first portion of the first uplink communication. In some cases, this determination may be based on when the grant of 615 was received in relation to when the first uplink communication was scheduled (e.g., as discussed in more detail with reference to FIG. 4).

At 635, UE 115-b may transmit the first portion of the first uplink transmission (e.g., the first portion of the first uplink communication) at the second power level. That is, the UE 115-b may modify the TPC command received in the grant at 605 to power boost the first portion of the first uplink transmission if the UE is capable of doing so.

Figure 7:
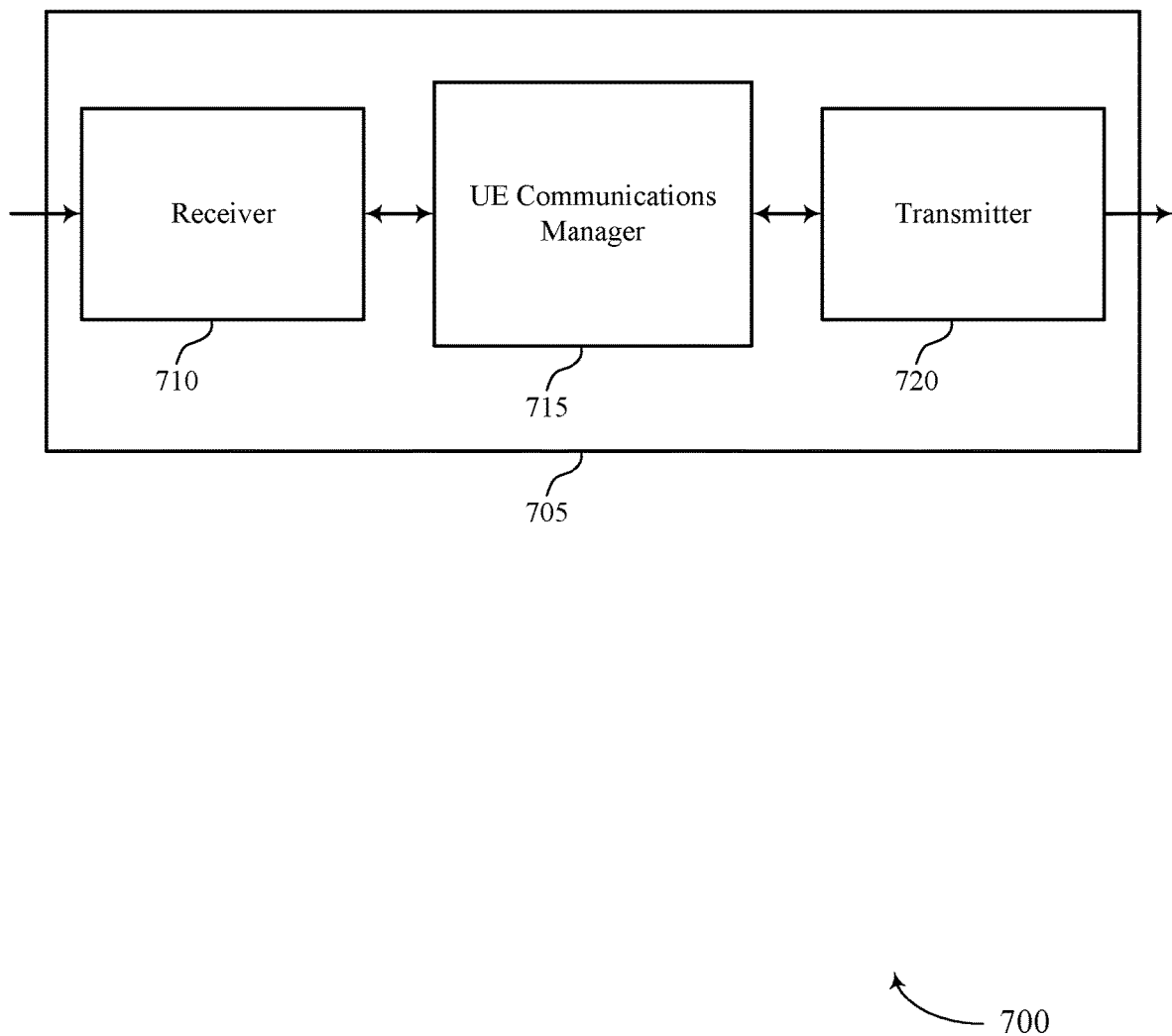
FIGS. 7 through 9 show block diagrams of a device that supports TPC command handling across multiple DCI messages in accordance with aspects of the present disclosure.

FIG. 7 shows a block diagram 700 of a wireless device 705 that supports TPC command handling across multiple DCIs in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to TPC command handling across multiple DCI messages, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a base station, a set of DCI messages that include a set of TPC commands for a UCI and determine a power adjustment value for the UCI based on a combination of the set of TPC commands. UE communications manager 715 may adjust a transmit power level based on the determined power adjustment value, and transmit a UCI to the base station at the adjusted transmit power level. The UE communications manager 715 may also identify a first uplink communication scheduled to be transmitted at a first transmit power level to a base station according to a first uplink grant. UE communications manager 715 may receive, from the base station, a second uplink grant for a second uplink communication, the second uplink communication having a higher priority than the first uplink communication. UE communications manager 715 may determine, based on receiving the second uplink grant, to transmit a first portion of the first uplink communication scheduled to be transmitted at the first transmit power and delay transmission of a second portion of the first uplink communication. UE communications manager 715 may determine whether to increase the first transmit power level for the first portion of the first uplink communication to a second transmit power level based on determining to transmit the first portion of the first uplink communication.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
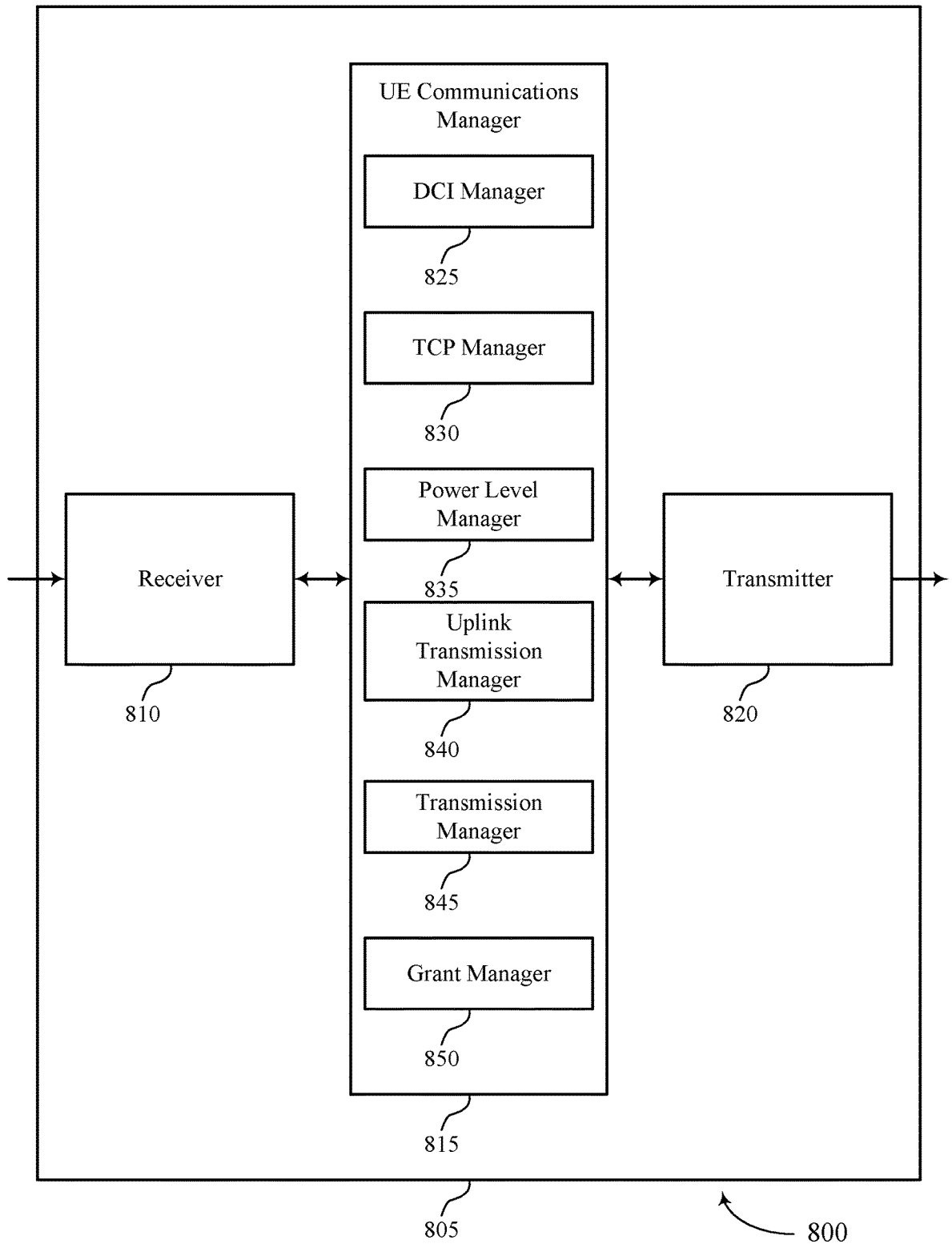

FIG. 8 shows a block diagram 800 of a wireless device 805 that supports TPC command handling across multiple DCI messages in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to TPC command handling across multiple DCI messages, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include DCI manager 825, TPC manager 830, power level manager 835, uplink transmission manager 840, transmission manager 845, and grant manager 850.

DCI manager 825 may receive, from a base station, a set of DCI messages that include a set of TPC commands for a UCI. DCI manager 825 may receive a DCI message that includes a first TPC command for an uplink data channel and a second TPC command for the UCI on a control channel. DCI manager 825 may receive a DCI message that includes a TPC command for an uplink data channel. In some cases, receiving the set of DCI messages for the UCI further includes receiving at least one DCI message that includes a TPC command for an uplink data channel, the power adjustment value for the UCI determined based on the TPC command for the uplink data channel.

TPC manager 830 may determine a power adjustment value for the UCI based on a combination of the set of TPC commands.

Power level manager 835 may adjust a transmit power level based on the determined power adjustment value. Power level manager 835 may determine, prior to identifying a change in the at least one attribute (e.g., uplink transmission attribute), the power adjustment value for the UCI based on a second set of TPC commands for the UCI. The set of TPC commands may be restricted to have a common TPC value for TPC commands associated with a single UCI. Power level manager 835 may determine whether to increase the first transmit power level for the first portion of the first uplink communication to a second transmit power level based on determining to transmit the first portion of the first uplink communication. Power level manager 835 may limit the second transmit power level to be no more than a threshold power level. Power level manager 835 may transmit the first portion of the first uplink communication at the first transmit power level. Power level manager 835 may transmit the first portion of the first uplink communication at the second transmit power level.

uplink transmission manager 840 may transmit a UCI to the base station at the adjusted transmit power level. In some cases, the UCI includes an acknowledgement on an uplink control channel or on an uplink data channel.

Transmission manager 845 may identify a first uplink communication scheduled to be transmitted at a first transmit power level to a base station according to a first uplink grant. Transmission manager 845 may determine, based on receiving the second uplink grant, to transmit a first portion of the first uplink communication scheduled to be transmitted at the first transmit power and may delay transmission of a second portion of the first uplink communication. Transmission manager 845 may transmit the first portion of the first uplink communication at the second transmit power level.

Grant manager 850 may receive, from the base station, a second uplink grant for a second uplink communication, the second uplink communication having a higher priority than the first uplink communication.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
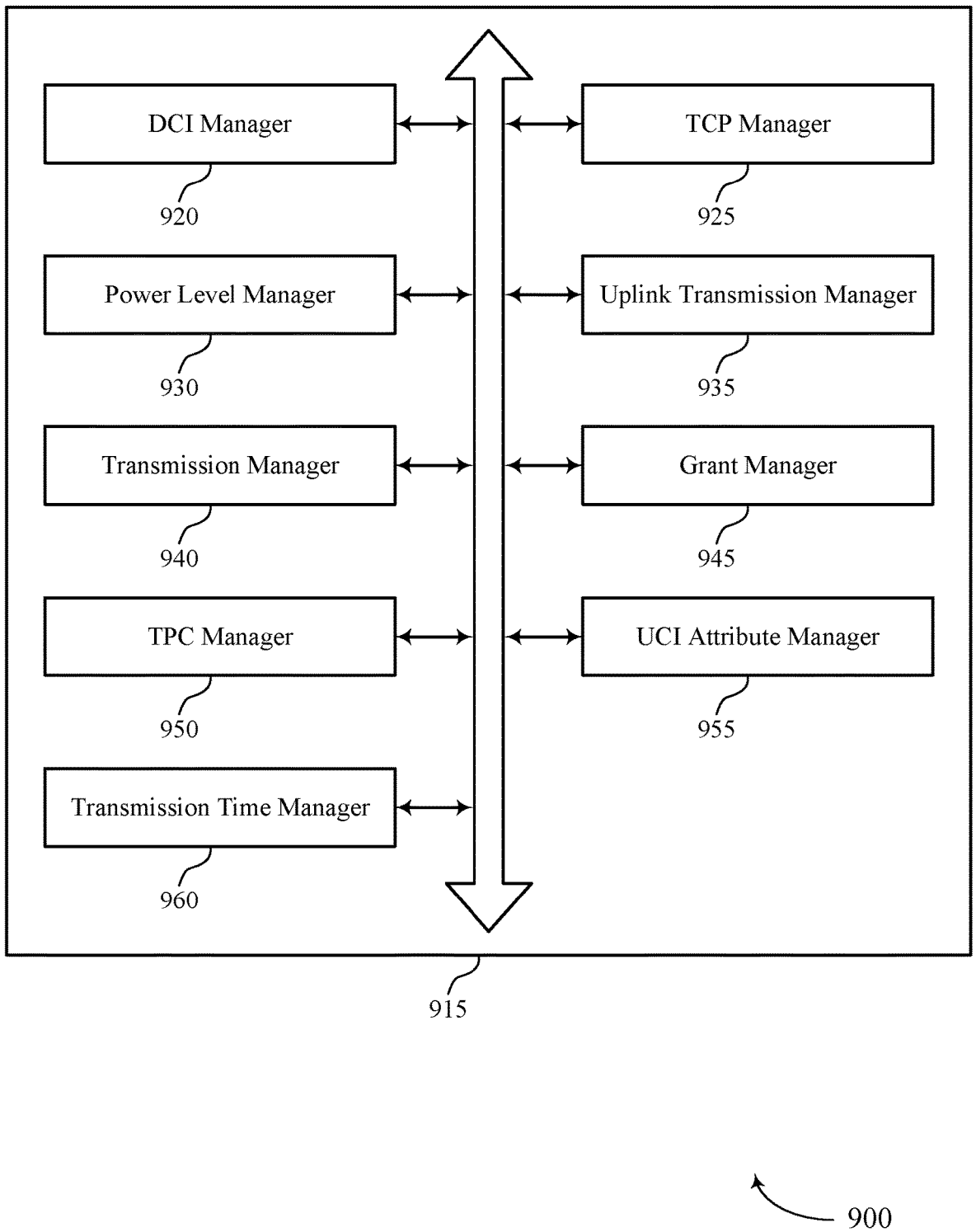

FIG. 9 shows a block diagram 900 of a UE communications manager 915 that supports TPC command handling across multiple DCI messages in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include DCI manager 920, TPC manager 925, power level manager 930, uplink transmission manager 935, transmission manager 940, grant manager 945, TPC manager 950, UCI attribute manager 955, and transmission time manager 960. Each of these modules may communicate, directly or indirectly, with one another (e.g., via one or more buses).

DCI manager 920 may receive, from a base station, a set of DCI messages that includes a set of TPC commands for a UCI. DCI manager 920 may receive a DCI message that includes a first TPC command for an uplink data channel and a second TPC command for the UCI on a control channel. DCI manager 920 may receive a DCI message that includes a TPC command for an uplink data channel. In some cases, receiving the set of DCI messages for the UCI further includes receiving at least one DCI message that includes a TPC command for an uplink data channel, the power adjustment value for the UCI determined based on the TPC command for the uplink data channel.

TPC manager 925 may determine a power adjustment value for the UCI based on a combination of the set of TPC commands.

Power level manager 930 may adjust a transmit power level based on the determined power adjustment value. Power level manager 930 may determine, prior to identifying the change in the at least one attribute, the power adjustment value for the UCI based on a second set of TPC commands for the UCI, with the set of TPC commands restricted to have a common TPC value for TPC commands associated with a single UCI. Power level manager 930 may determine whether to increase the first transmit power level for the first portion of the first uplink communication to a second transmit power level based on determining to transmit the first portion of the first uplink communication. Power level manager 930 may limit the second transmit power level to be no more than a threshold power level. Power level manager 930 may transmit the first portion of the first uplink communication at the first transmit power level. Power level manager 930 may transmit the first portion of the first uplink communication at the second transmit power level.

Uplink transmission manager 935 may transmit a UCI to the base station at the adjusted transmit power level. In some cases, the UCI includes an acknowledgement on an uplink control channel or on an uplink data channel.

Transmission manager 940 may identify a first uplink communication scheduled to be transmitted at a first transmit power level to a base station according to a first uplink grant, determine, based on receiving the second uplink grant, to transmit a first portion of the first uplink communication scheduled to be transmitted at the first transmit power and delay transmission of a second portion of the first uplink communication, and transmit the first portion of the first uplink communication at the second transmit power level.

Grant manager 945 may receive, from the base station, a second uplink grant for a second uplink communication, the second uplink communication having a higher priority than the first uplink communication.

TPC manager 950 may sum the set of TPC values to determine the power adjustment value, scale the set of TPC values based on a number of the set of TPC commands, where summing the set of TPC values includes summing the scaled set of TPC values. TPC manager 950 may determine the power adjustment value for the UCI based on the most recently-received TPC command. TPC manager 950 may ignore, based on the TPC command for the uplink data channel, one or more TPC commands of the set of TPC commands for the UCI, where the one or more TPC commands are for an uplink control channel. In some cases, determining the power adjustment value for the UCI based on the combination of the set of TPC commands includes identifying a set of TPC values from the set of TPC commands. In some cases, determining the power adjustment value for the UCI based on the combination of the set of TPC commands includes identifying a most recently-received TPC command of the set of TPC commands.

UCI attribute manager 955 may identify a change in at least one attribute of the UCI, determine the power adjustment value for the UCI based on the combination of the set of TPC commands based on the identified change, and receive a value for at least one attribute in one or more of the set of DCI messages, where the change in at least one attribute of the UCI is identified based on the received value for the at least one attribute. In some cases, the at least one attribute of the UCI includes a UCI payload size, or a physical uplink control channel (PUCCH) resource assignment, or a PUCCH format, or a PUCCH resource pool, or a combination thereof.

Transmission time manager 960 may identify that the second uplink grant was received by the UE less than a threshold amount of time before the first uplink communication is to be transmitted by the UE, and may identify that the second uplink grant was received by the UE more than a threshold amount of time before the first uplink communication is to be transmitted by the UE. In some cases, the threshold amount of time includes a number of symbol periods.

Figure 10:
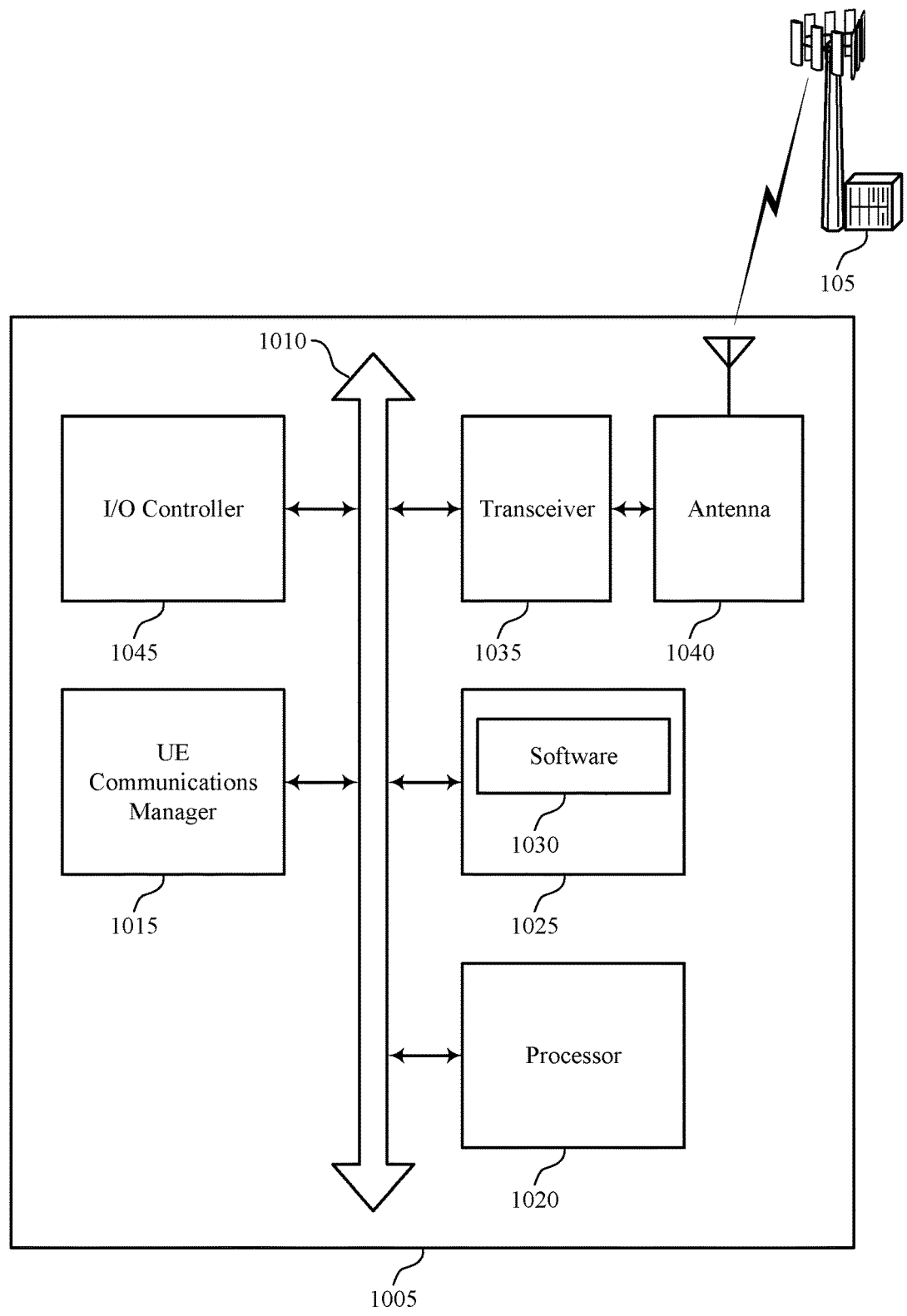
FIG. 10 illustrates a block diagram of a system including a UE that supports TPC command handling across multiple DCI messages in accordance with aspects of the present disclosure.

FIG. 10 shows a diagram of a system 1000 including a device 1005 that supports TPC command handling across multiple DCI messages in accordance with aspects of the present disclosure. Device 1005 may be an example of or include the components of wireless device 705, wireless device 805, or a UE 115 as described herein, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting TPC command handling across multiple DCI messages).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support TPC command handling across multiple DCI messages. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
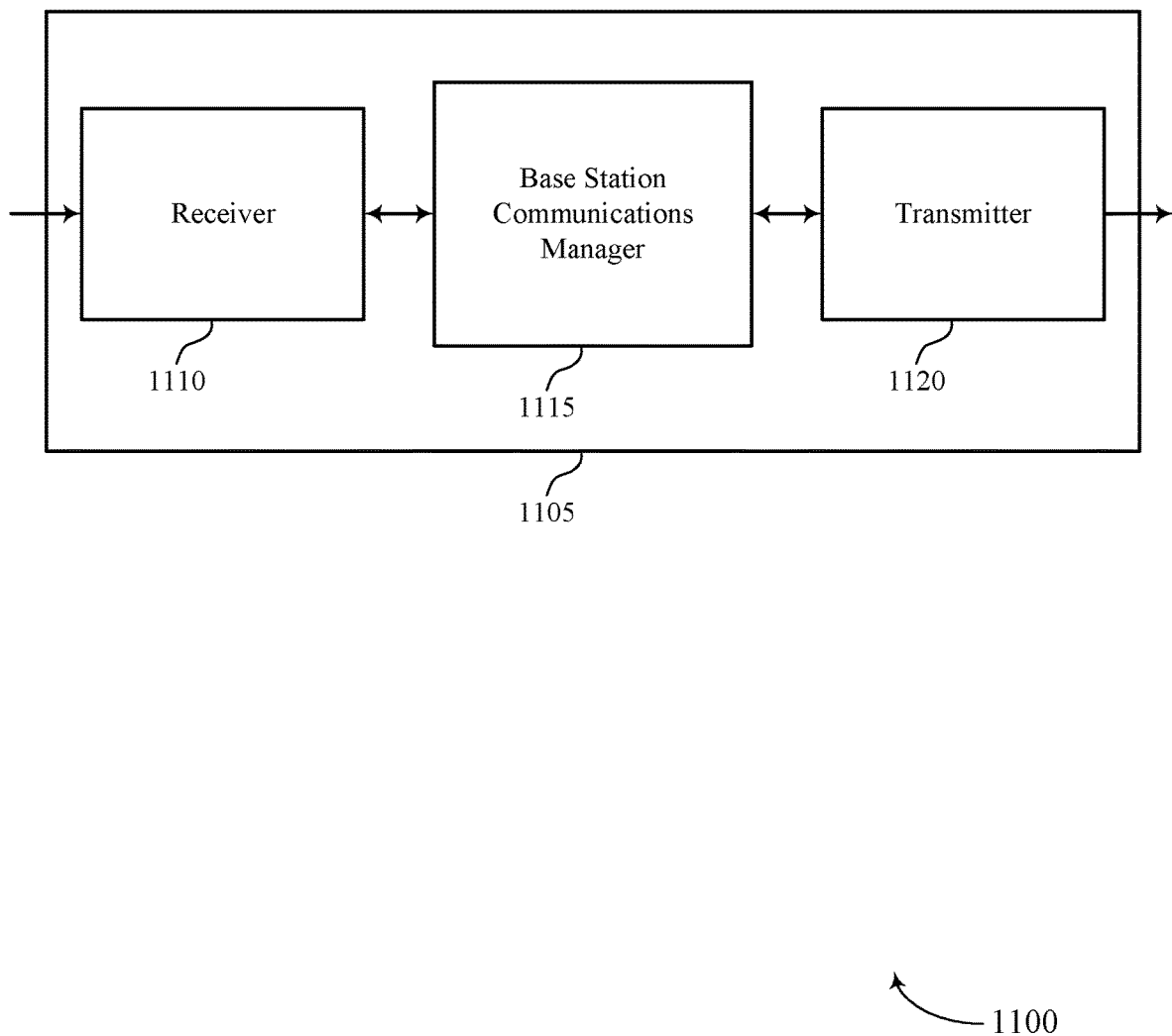
FIGS. 11 through 13 show block diagrams of a device that supports TPC command handling across multiple DCI messages in accordance with aspects of the present disclosure.

FIG. 11 shows a block diagram 1100 of a wireless device 1105 that supports TPC command handling across multiple DCI messages in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to TPC command handling across multiple DCI messages, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify, by the base station, a power adjustment value to adjust a transmit power level of a UCI to be transmitted by a UE, determine, based on the identified power adjustment value, a set of TPC commands for the UCI, a combination of the set of TPC commands to indicate the power adjustment value to adjust the transmit power for the UCI, and transmit, to the UE, a set of DCI messages that include the determined set of TPC commands.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
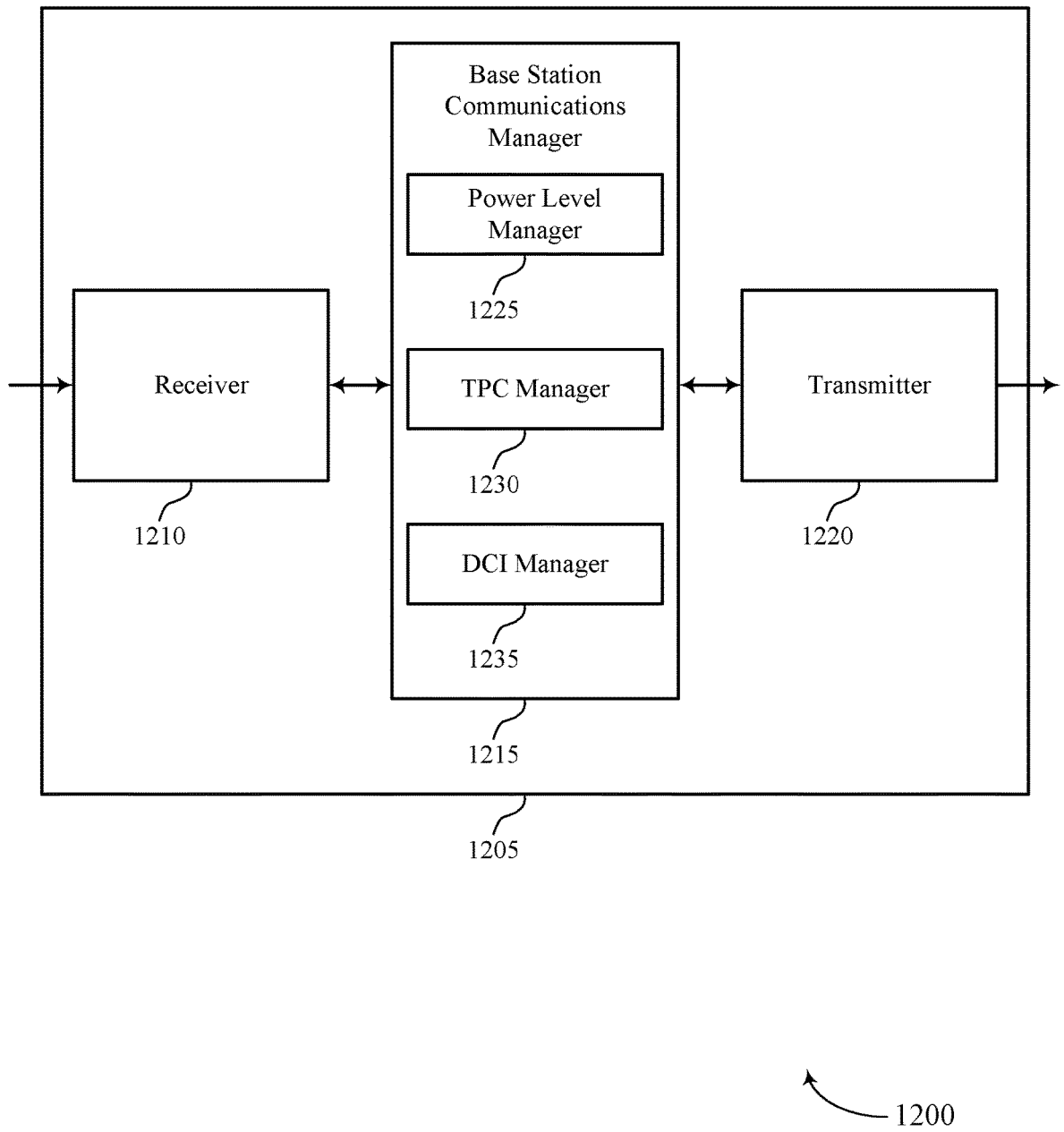

FIG. 12 shows a block diagram 1200 of a wireless device 1205 that supports TPC command handling across multiple DCI messages in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to TPC command handling across multiple DCI messages, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include power level manager 1225, TPC manager 1230, and DCI manager 1235.

Power level manager 1225 may identify, by the base station, a power adjustment value to adjust a transmit power level of a UCI to be transmitted by a UE. In some cases, the power adjustment value is a sum of a set of TPC values for the set of TPC commands.

TPC manager 1230 may determine, based on the identified power adjustment value, a set of TPC commands for the UCI, a combination of the set of TPC commands to indicate the power adjustment value to adjust the transmit power for the UCI.

DCI manager 1235 may transmit, to the UE, a set of DCI messages that include the determined set of TPC commands. In some cases, transmitting the determined set of DCI messages to the UE further includes transmitting at least one uplink DCI message that includes a TPC command for an uplink data channel, the set of TPC commands for the UCI determined based on the TPC command for the uplink data channel.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
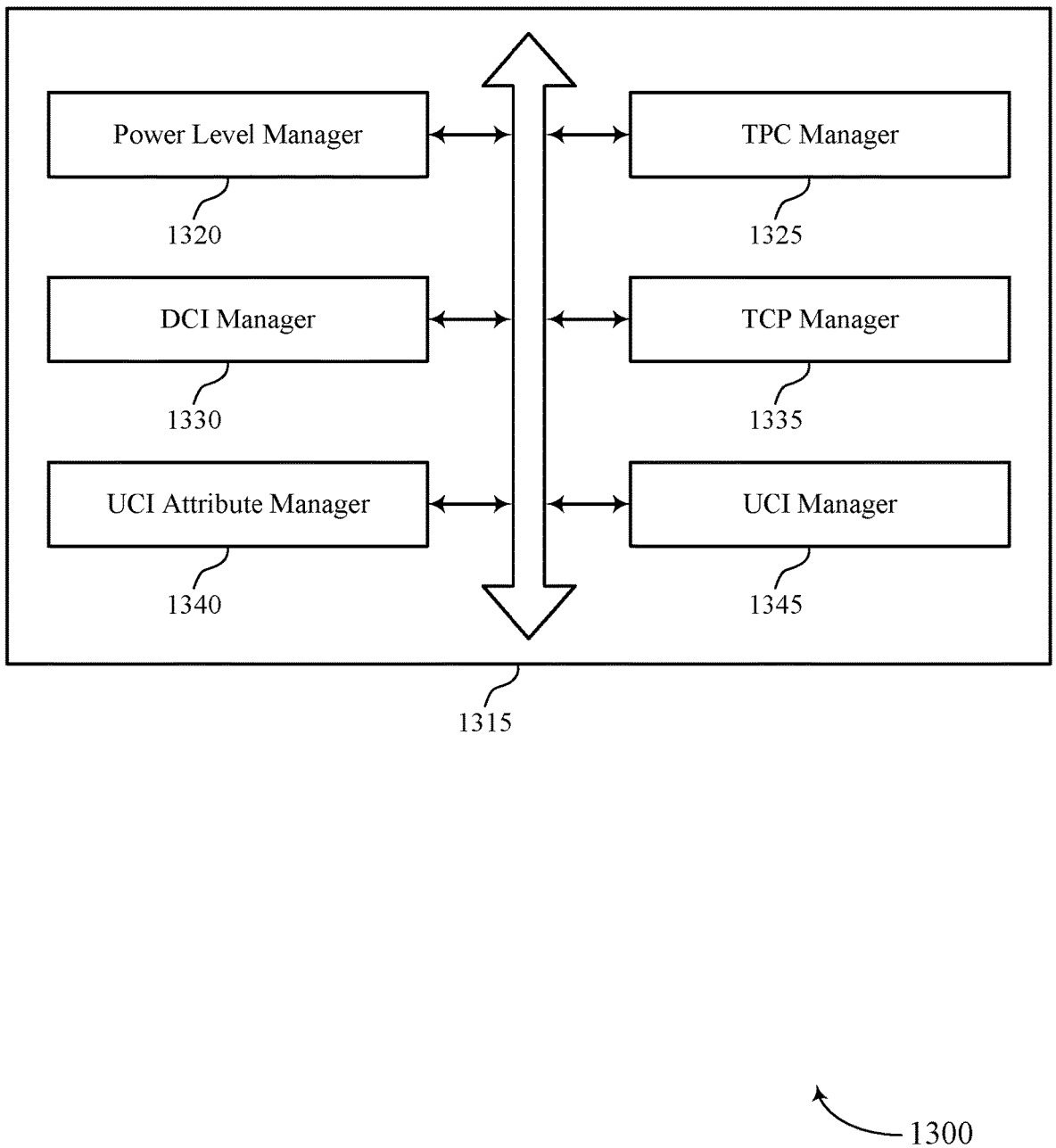

FIG. 13 shows a block diagram 1300 of a base station communications manager 1315 that supports TPC command handling across multiple DCI messages in accordance with aspects of the present disclosure. The base station communications manager 1315 may be an example of aspects of a base station communications manager 1415 described with reference to FIGS. 11, 12, and 14. The base station communications manager 1315 may include power level manager 1320, TPC manager 1325, DCI manager 1330, TPC manager 1335, UCI attribute manager 1340, and uplink transmission manager 1345. Each of these modules may communicate, directly or indirectly, with one another (e.g., via one or more buses).

Power level manager 1320 may identify, by the base station, a power adjustment value to adjust a transmit power level of a UCI to be transmitted by a UE. In some cases, the power adjustment value is a sum of a set of TPC values for the set of TPC commands.

TPC manager 1325 may determine, based on the identified power adjustment value, a set of TPC commands for the UCI, a combination of the set of TPC commands to indicate the power adjustment value to adjust the transmit power for the UCI.

DCI manager 1330 may transmit, to the UE, a set of DCI messages that include the determined set of TPC commands. In some cases, transmitting the determined set of DCI messages to the UE further includes transmitting at least one uplink DCI message that includes a TPC command for an uplink data channel, where the set of TPC commands for the UCI may be determined based on the TPC command for the uplink data channel.

TPC manager 1335 may assign the power adjustment value to be the TPC value for the identified first TPC command based on the identification. In some cases, determining the set of TPC commands further includes identifying that the UE is to use a first TPC command of the set of TPC commands as the power adjustment value.

In some cases, UCI attribute manager 1340 may determine an uplink transmission attribute based on the set of DCI messages. In some cases, the set of DCI messages indicate a change in a value of at least one attribute for the UCI, where determining the set of TPC commands is based on the change in the value of the at least one attribute. In some cases, the at least one attribute of the UCI includes a UCI payload size, a PUCCH resource assignment, a PUCCH format, a PUCCH resource pool, or a combination thereof.

Uplink transmission manager 1345 may receive, from the UE, the UCI transmitted according to the transmit power. In some cases, the UCI includes an acknowledgement on an uplink control channel or an uplink data channel.

Figure 14:
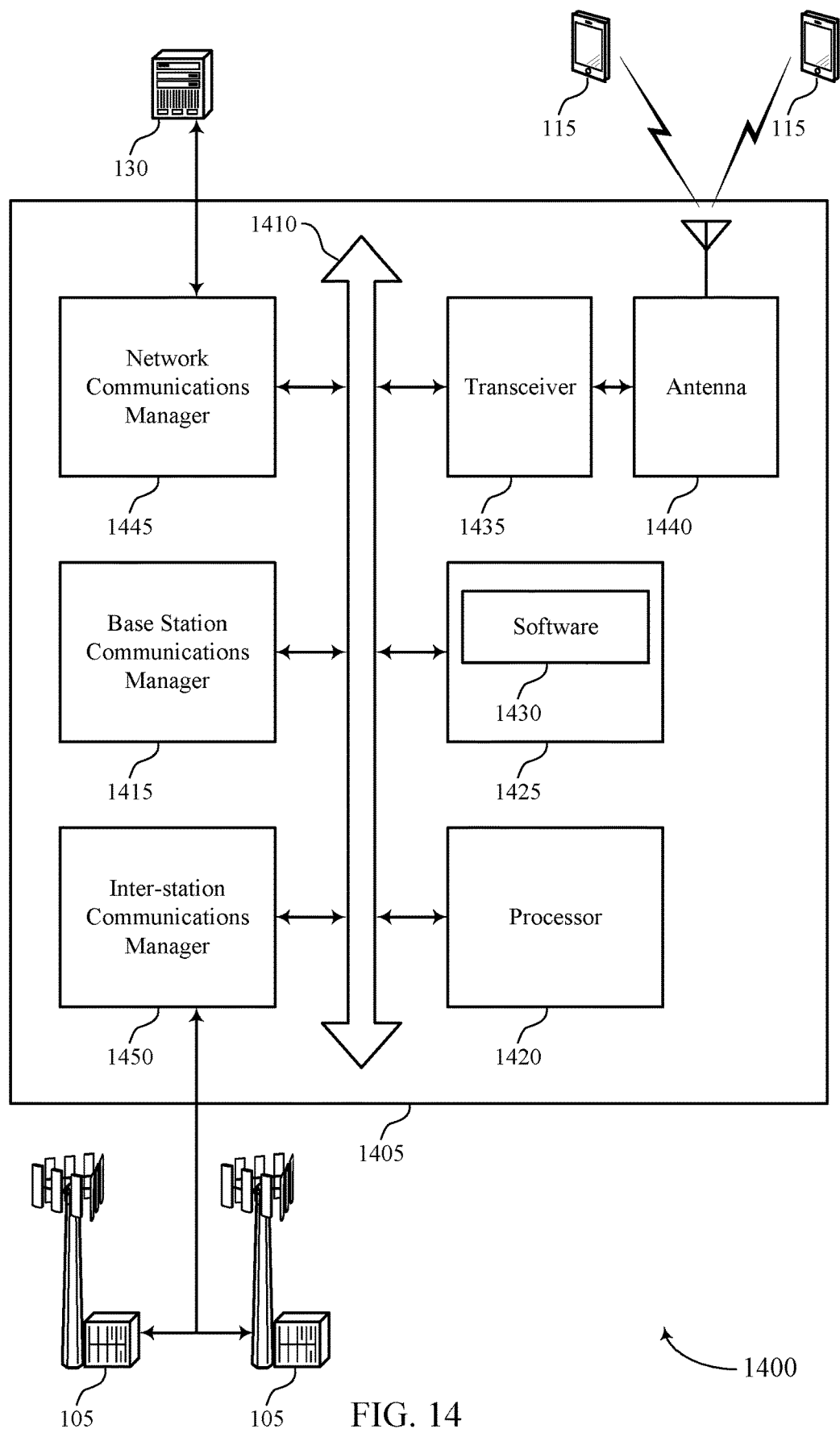
FIG. 14 illustrates a block diagram of a system including a base station that supports TPC command handling across multiple DCI messages in accordance with aspects of the present disclosure.

FIG. 14 shows a diagram of a system 1400 including a device 1405 that supports TPC command handling across multiple DCI messages in accordance with aspects of the present disclosure. Device 1405 may be an example of or include the components of base station 105 as described herein, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting TPC command handling across multiple DCI messages).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support TPC command handling across multiple DCI messages. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 associated with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
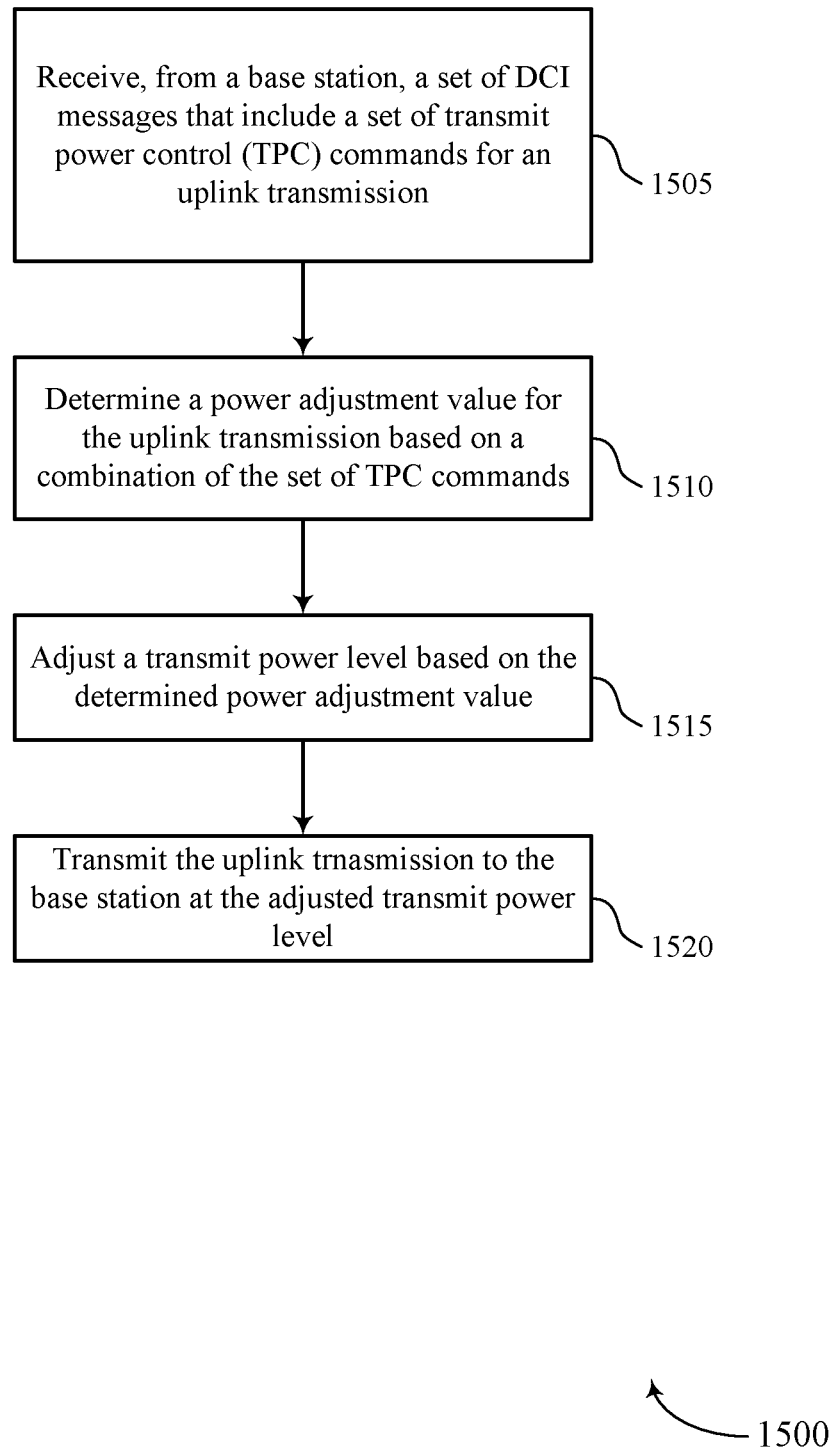
FIGS. 15 through 17 illustrate methods for TPC command handling across multiple DCI messages in accordance with aspects of the present disclosure.

FIG. 15 shows a flowchart illustrating a method 1500 for TPC command handling across multiple DCI messages in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive, from a base station, a number of DCI messages that include a number of TPC commands for an uplink transmission (e.g., UCI, uplink data, etc.). The operations of 1505 may be performed according to the methods described herein. In certain examples, aspects of the operations of 1505 may be performed by a DCI manager as described with reference to FIGS. 7 through 10.

At 1510 the UE 115 may determine a power adjustment value for the uplink transmission based on a combination of the number of TPC commands. The operations of 1510 may be performed according to the methods described herein. In certain examples, aspects of the operations of 1510 may be performed by a TPC manager as described with reference to FIGS. 7 through 10.

At 1515 the UE 115 may adjust a transmit power level based on the determined power adjustment value. The operations of 1515 may be performed according to the methods described herein. In certain examples, aspects of the operations of 1515 may be performed by a power level manager as described with reference to FIGS. 7 through 10.

At 1520 the UE 115 may transmit the uplink transmission to the base station at the adjusted transmit power level. The operations of 1520 may be performed according to the methods described herein. In certain examples, aspects of the operations of 1520 may be performed by an uplink transmission manager as described with reference to FIGS. 7 through 10.

Figure 16:
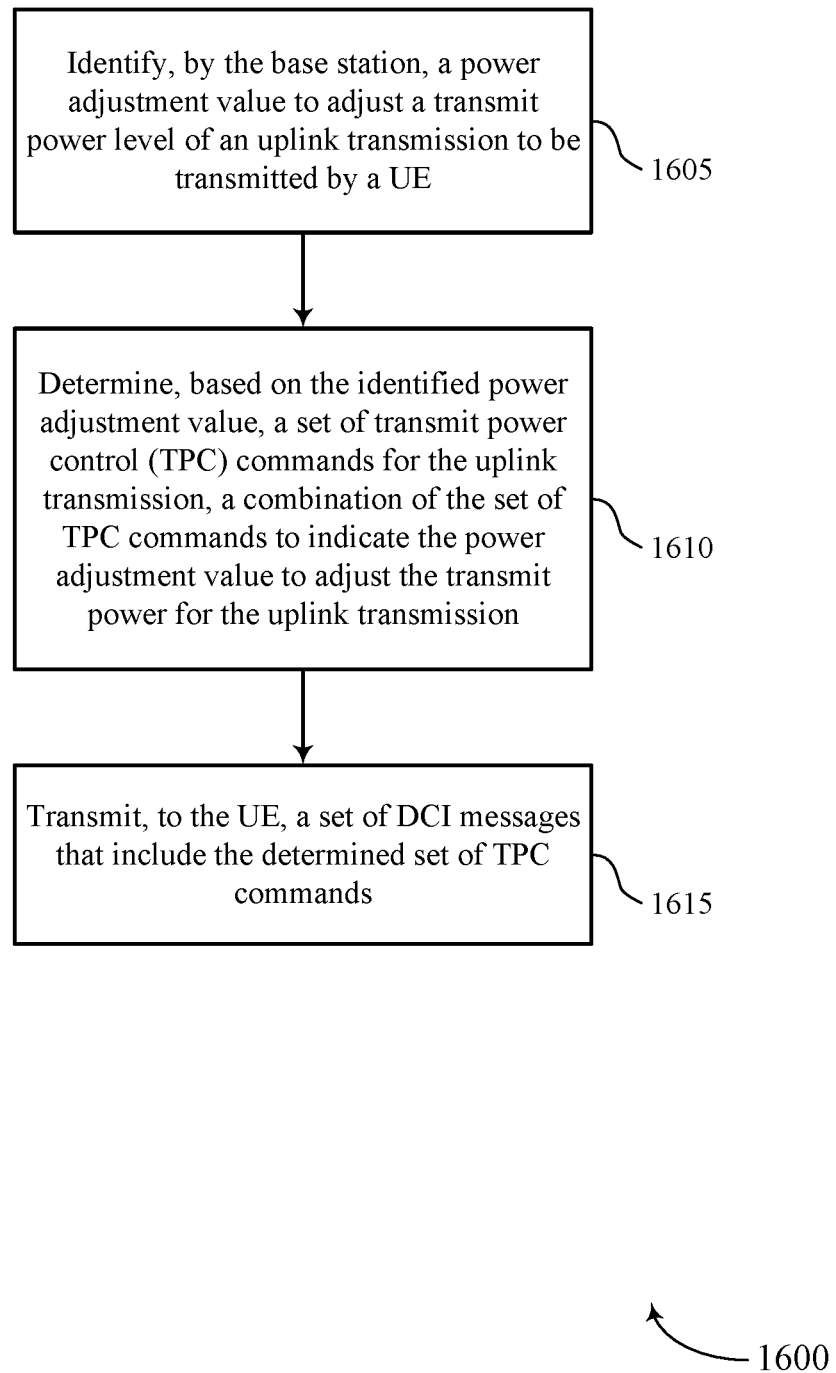

FIG. 16 shows a flowchart illustrating a method 1600 for TPC command handling across multiple DCI messages in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may identify, by the base station, a power adjustment value to adjust a transmit power level of an uplink transmission (e.g., UCI, uplink data, etc.) to be transmitted by a UE. The operations of 1605 may be performed according to the methods described herein. In certain examples, aspects of the operations of 1605 may be performed by a power level manager as described with reference to FIGS. 11 through 14.

At 1610 the base station 105 may determine, based on the identified power adjustment value, a number of TPC commands for the uplink transmission, a combination of the number of TPC commands to indicate the power adjustment value to adjust the transmit power for the uplink transmission. The operations of 1610 may be performed according to the methods described herein. In certain examples, aspects of the operations of 1610 may be performed by a TPC manager as described with reference to FIGS. 11 through 14.

At 1615 the base station 105 may transmit, to the UE, a number of DCI messages that include the determined number of TPC commands. The operations of 1615 may be performed according to the methods described herein. In certain examples, aspects of the operations of 1615 may be performed by a DCI manager as described with reference to FIGS. 11 through 14.

Figure 17:
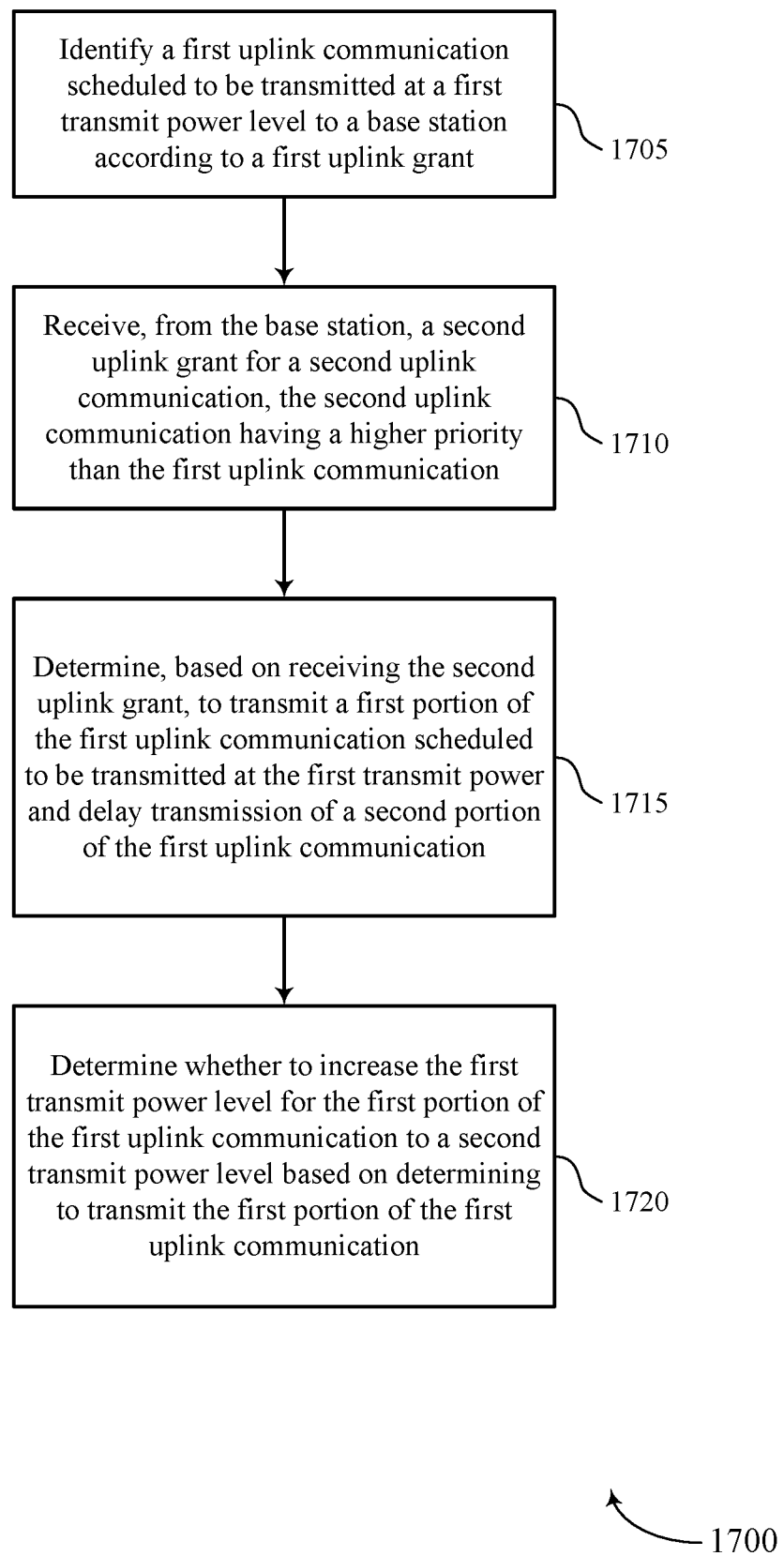

FIG. 17 shows a flowchart illustrating a method 1700 for TPC command handling across multiple DCI messages in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may identify a first uplink communication scheduled to be transmitted at a first transmit power level to a base station according to a first uplink grant. The operations of 1705 may be performed according to the methods described herein. In certain examples, aspects of the operations of 1705 may be performed by a transmission manager as described with reference to FIGS. 7 through 10.

At 1710 the UE 115 may receive, from the base station, a second uplink grant for a second uplink communication, the second uplink communication having a higher priority than the first uplink communication. The operations of 1710 may be performed according to the methods described herein. In certain examples, aspects of the operations of 1710 may be performed by a grant manager as described with reference to FIGS. 7 through 10.

At 1715 the UE 115 may determine, based on receiving the second uplink grant, to transmit a first portion of the first uplink communication scheduled to be transmitted at the first transmit power and delay transmission of a second portion of the first uplink communication. The operations of 1715 may be performed according to the methods described herein. In certain examples, aspects of the operations of 1715 may be performed by a transmission manager as described with reference to FIGS. 7 through 10.

At 1720 the UE 115 may determine whether to increase the first transmit power level for the first portion of the first uplink communication to a second transmit power level based on determining to transmit the first portion of the first uplink communication. The operations of 1720 may be performed according to the methods described herein. In certain examples, aspects of the operations of 1720 may be performed by a power level manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a plurality of downlink control information (DCI) messages that include a plurality of transmit power control (TPC) commands for an uplink transmission;
   determining a power adjustment value for the uplink transmission based at least in part on a combination of the plurality of TPC commands, the combination of the plurality of TPC commands including at least a first TPC command of a first DCI message and a second TPC command of a second DCI message;
   adjusting a transmit power level based at least in part on the determined power adjustment value; and
   transmitting the uplink transmission to the base station at the adjusted transmit power level.

2. The method of claim 1, wherein determining the power adjustment value for the uplink transmission based at least in part on the combination of the plurality of TPC commands comprises:
   identifying a plurality of TPC values from the plurality of TPC commands; and
   summing the plurality of TPC values to determine the power adjustment value.

3. The method of claim 2, further comprising:
   scaling the plurality of TPC values based at least in part on a number of the plurality of TPC commands, wherein summing the plurality of TPC values includes summing the scaled plurality of TPC values.

4. The method of claim 1, wherein determining the power adjustment value for the uplink transmission based at least in part on the combination of the plurality of TPC commands comprises:
   identifying a most recently-received TPC command of the plurality of TPC commands; and
   determining the power adjustment value for the uplink transmission based at least in part on the most recently-received TPC command.

5. The method of claim 1, further comprising:
   identifying a change in at least one attribute of the uplink transmission; and
   determining the power adjustment value for the uplink transmission based at least in part on the combination of the plurality of TPC commands based at least in part on the identified change.

6. The method of claim 5, further comprising:
   receiving a value for at least one attribute in one or more of the plurality of DCI messages, wherein the change in at least one attribute of the uplink transmission is identified based at least in part on the received value for the at least one attribute.

7. The method of claim 5, wherein the at least one attribute of the uplink transmission comprises a UCI payload size, or a physical uplink control channel (PUCCH) resource assignment, or a PUCCH format, or a PUCCH resource pool, or a combination thereof.

8. The method of claim 5, wherein the uplink transmission is an uplink control information (UCI), the method further comprising:
determining, prior to identifying the change in the at least one attribute, the power adjustment value for the UCI based at least in part on a second plurality of TPC commands for the UCI, the plurality of TPC commands restricted to have a common TPC value for TPC commands associated with a single UCI.

9. The method of claim 1, wherein the uplink transmission is an uplink control information (UCI), and receiving the plurality of DCI messages for the UCI further comprises:
receiving at least one DCI message that includes a TPC command for an uplink data channel, the power adjustment value for the UCI determined based at least in part on the TPC command for the uplink data channel.

10. The method of claim 1, further comprising:
receiving a DCI message that includes a first TPC command for an uplink data channel and a second TPC command for uplink control information (UCI) on a control channel, wherein the uplink transmission comprises the UCI.

11. The method of claim 1, further comprising:
receiving a DCI message that includes a TPC command for an uplink data channel; and
ignoring, based at least in part on the TPC command for the uplink data channel, one or more TPC commands of the plurality of TPC commands for uplink control information (UCI), wherein the one or more TPC commands are for an uplink control channel, wherein the uplink transmission comprises the UCI.

12. The method of claim 1, wherein the uplink transmission comprises an acknowledgement on an uplink control channel, or an acknowledgement on an uplink data channel, or an uplink data transmission.

13. A method for wireless communication at a base station, comprising:
identifying, by the base station, a power adjustment value to adjust a transmit power level of an uplink transmission to be transmitted by a user equipment (UE);
determining, based at least in part on the identified power adjustment value, a plurality of transmit power control (TPC) commands for the uplink transmission, a combination of the plurality of TPC commands to indicate the power adjustment value to adjust the transmit power for the uplink transmission; and
transmitting, to the UE, a plurality of downlink control information (DCI) messages that include the determined plurality of TPC commands, the combination of the plurality of TPC commands including at least a first TPC command of a first DCI message and a second TPC command of a second DCI message.

14. The method of claim 13, wherein the power adjustment value is a sum of a plurality of TPC values for the plurality of TPC commands.

15. The method of claim 13, wherein determining the plurality of TPC commands further comprises:
identifying that the UE is to use a first TPC command of the plurality of TPC commands as the power adjustment value; and
assigning the power adjustment value to be the TPC value for the identified first TPC command based at least in part on the identification.

16. The method of claim 13, wherein the plurality of DCI messages indicate a change in a value of at least one attribute for an uplink control information (UCI), wherein determining the plurality of TPC commands is based at least in part on the change in the value of the at least one attribute.

17. The method of claim 16, wherein the at least one attribute of the uplink transmission comprises a UCI payload size, or a physical uplink control channel (PUCCH) resource assignment, or a PUCCH format, or a PUCCH resource pool, or a combination thereof.

18. The method of claim 13, wherein transmitting the determined plurality of DCI messages to the UE further comprises:
transmitting at least one uplink DCI message that includes a TPC command for an uplink data channel, the plurality of TPC commands for the uplink transmission determined based at least in part on the TPC command for the uplink data channel.

19. The method of claim 13, further comprising:
receiving, from the UE, the uplink transmission transmitted according to the transmit power.

20. The method of claim 19, wherein the UCI comprises an acknowledgement on an uplink control channel, or an acknowledgement on an uplink data channel, or an uplink data transmission.

21. An apparatus for wireless communication at a user equipment (UE), comprising:
a processor;
memory in electronic communication with the processor; and
instructions stored in the memory and executable by the processor to cause the apparatus to:
receive, from a base station, a plurality of downlink control information (DCI) messages that include a plurality of transmit power control (TPC) commands for an uplink transmission;
determine a power adjustment value for the uplink transmission based at least in part on a combination of the plurality of TPC commands, the combination of the plurality of TPC commands including at least a first TPC command of a first DCI message and a second TPC command of a second DCI message;
adjust a transmit power level based at least in part on the determined power adjustment value; and
transmit an uplink transmission to the base station at the adjusted transmit power level.

22. The apparatus of claim 21, wherein the instructions to determine the power adjustment value for the uplink transmission based at least in part on the combination of the plurality of TPC commands are executable by the processor to cause the apparatus to:
identify a plurality of TPC values from the plurality of TPC commands; and
sum the plurality of TPC values to determine the power adjustment value.

23. The apparatus of claim 22, wherein the instructions are further executable by the processor to cause the apparatus to:
scale the plurality of TPC values based at least in part on a number of the plurality of TPC commands, wherein summing the plurality of TPC values includes summing the scaled plurality of TPC values.

24. The apparatus of claim 21, wherein the instructions to determine the power adjustment value for the uplink transmission based at least in part on the combination of the plurality of TPC commands are executable by the processor to cause the apparatus to:
- identify a most recently-received TPC command of the plurality of TPC commands; and
- determine the power adjustment value for the uplink transmission based at least in part on the most recently-received TPC command.

25. An apparatus for wireless communication at a base station, comprising:
- a processor;
- memory in electronic communication with the processor; and
- instructions stored in the memory and executable by the processor to cause the apparatus to:
  - identify, by the base station, a power adjustment value to adjust a transmit power level of an uplink transmission to be transmitted by a user equipment (UE);
  - determine, based at least in part on the identified power adjustment value, a plurality of transmit power control (TPC) commands for the uplink transmission, a combination of the plurality of TPC commands to indicate the power adjustment value to adjust the transmit power for the uplink transmission; and
  - transmit, to the UE, a plurality of downlink control information (DCI) messages that include the determined plurality of TPC commands, the combination of the plurality of TPC commands including at least a first TPC command of a first DCI message and a second TPC command of a second DCI message.

26. The apparatus of claim 25, wherein the power adjustment value is a sum of a plurality of TPC values for the plurality of TPC commands.

27. The apparatus of claim 25, wherein the instructions to determine, based at least in part on the identified power adjustment value, the plurality of TPC commands for the uplink transmission further comprises:
- identifying that the UE is to use a first TPC command of the plurality of TPC commands as the power adjustment value; and
- assigning the power adjustment value to be the TPC value for the identified first TPC command based at least in part on the identification.

28. The apparatus of claim 25, wherein the plurality of DCI messages indicate a change in a value of at least one attribute for an uplink control information (UCI), wherein determining the plurality of TPC commands is based at least in part on the change in the value of the at least one attribute.

29. The apparatus of claim 28, wherein the at least one attribute of the uplink transmission comprises a UCI payload size, or a physical uplink control channel (PUCCH) resource assignment, or a PUCCH format, or a PUCCH resource pool, or a combination thereof.

30. The apparatus of claim 25, wherein the instructions to transmit the determined plurality of DCI messages to the UE are further executable by the processor to cause the apparatus to:
- transmit at least one uplink DCI message that includes a TPC command for an uplink data channel, the plurality of TPC commands for the uplink transmission determined based at least in part on the TPC command for the uplink data channel.

* * * * *